US012699178B2

(12) United States Patent
Hu

(10) Patent No.: US 12,699,178 B2
(45) Date of Patent: Aug. 4, 2026

(54) INTER-NODE RANGING METHOD AND APPARATUS

(71) Applicant: Huawei Technologies Co., Ltd., Shenzhen (CN)

(72) Inventor: Yupeng Hu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 237 days.

(21) Appl. No.: 18/585,724

(22) Filed: Feb. 23, 2024

(65) Prior Publication Data

US 2024/0230883 A1 Jul. 11, 2024

Related U.S. Application Data

(63) Continuation of application No. PCT/CN2021/114151, filed on Aug. 23, 2021.

(51) Int. Cl.
*G01S 13/84* (2006.01)

(52) U.S. Cl.
CPC .................................... *G01S 13/84* (2013.01)

(58) Field of Classification Search
None
See application file for complete search history.

(56) References Cited

U.S. PATENT DOCUMENTS

| | | | |
|---|---|---|---|
| 10,495,744 | B2 | 12/2019 | Wallin |
| 2017/0168154 | A1* | 6/2017 | Wallin .................. G01S 13/767 |

FOREIGN PATENT DOCUMENTS

| | | |
|---|---|---|
| CN | 105589506 A | 5/2016 |
| CN | 111366813 A | 7/2020 |
| CN | 112367098 A | 2/2021 |
| JP | H10322752 A | 12/1998 |

OTHER PUBLICATIONS

Hildur Olafsdottir et al.,"On the Security of Carrier Phase-based Ranging," Oct. 2016, total 21 pages.
Jia Rui-wu et al, "Pseudo Echo Ranging," Dec. 19, 2009, pp. 1-6, XP031589774.

* cited by examiner

*Primary Examiner* — Whitney Moore
(74) *Attorney, Agent, or Firm* — Conley Rose, P.C.

(57) ABSTRACT

An inter-node ranging method includes a first node that sends a plurality of first sequences to a second node; the first node receives a plurality of second delayed sequences from the second node; the first node determines a first phase difference between the first sequences and the second delayed sequences; and the first node determines a distance between the first node and the second node based on the first phase difference.

20 Claims, 10 Drawing Sheets

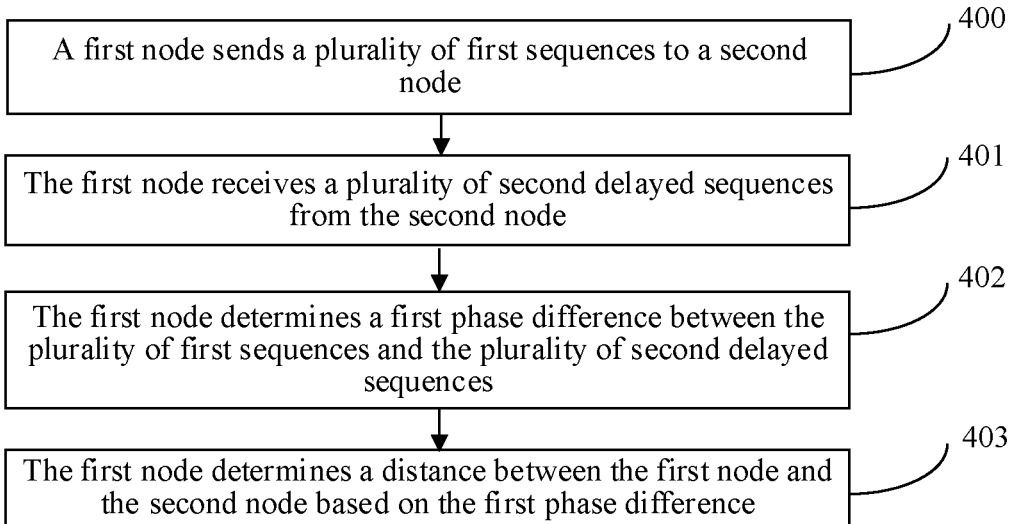

A first node sends a plurality of first sequences to a second node  400

The first node receives a plurality of second delayed sequences from the second node  401

The first node determines a first phase difference between the plurality of first sequences and the plurality of second delayed sequences  402

The first node determines a distance between the first node and the second node based on the first phase difference  403

FIG. 4

Figure 5:
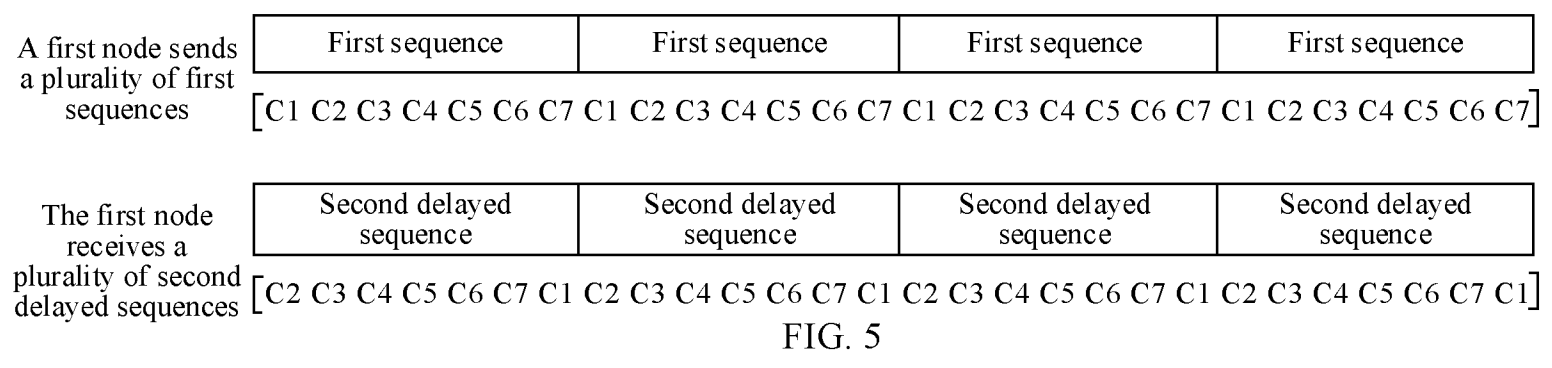

A first node sends a plurality of first sequences

| First sequence | First sequence | First sequence | First sequence |
|---|---|---|---|

[C1 C2 C3 C4 C5 C6 C7 C1 C2 C3 C4 C5 C6 C7 C1 C2 C3 C4 C5 C6 C7 C1 C2 C3 C4 C5 C6 C7]

The first node receives a plurality of second delayed sequences

| Second delayed sequence | Second delayed sequence | Second delayed sequence | Second delayed sequence |
|---|---|---|---|

Figure 7:
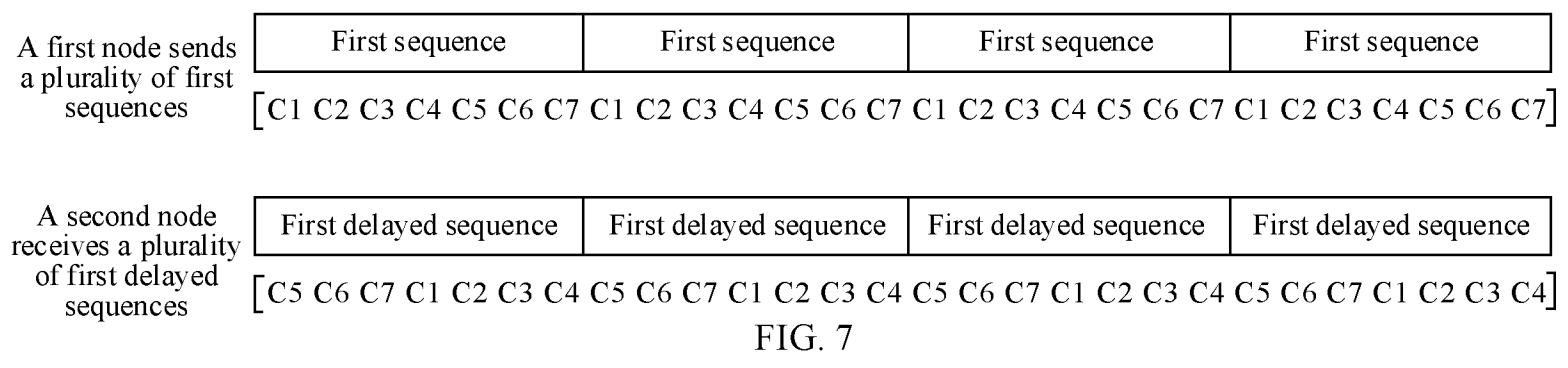

| A first node sends a plurality of first sequences | First sequence | First sequence | First sequence | First sequence |
|---|---|---|---|---|

$$[C1\ C2\ C3\ C4\ C5\ C6\ C7\ C1\ C2\ C3\ C4\ C5\ C6\ C7\ C1\ C2\ C3\ C4\ C5\ C6\ C7\ C1\ C2\ C3\ C4\ C5\ C6\ C7]$$

| A second node receives a plurality of first delayed sequences | First delayed sequence | First delayed sequence | First delayed sequence | First delayed sequence |
|---|---|---|---|---|

INTER-NODE RANGING METHOD AND APPARATUS

CROSS-REFERENCE TO RELATED APPLICATIONS

This is a continuation of International Patent Application No. PCT/CN2021/114151 filed on Aug. 23, 2021, which is hereby incorporated by reference in its entirety.

TECHNICAL FIELD

Embodiments of this disclosure relate to the field of chip technologies, and in particular, to an inter-node ranging method and an apparatus.

BACKGROUND

A power line carrier communication technology, referred to as a power-line communication (PLC) technology, is a means of implementing data transmission and information exchange using power lines as transmission media. In the power line communication technology, a transmit-side node converts information into a high-frequency signal and modulates the high-frequency signal to a current in a power line, and a receive-side node demodulates the signal to obtain the information transmitted by the transmit-side node, and transmits the information to a computer for processing, to implement information transmission.

With continuous development of the power line communication technology, the power line communication technology is applied more widely in a power distribution grid. For example, ranging may be performed, by using the power line communication technology, between any two nodes on which power line communication modules are installed, and a topology diagram of the power distribution grid is automatically identified by using a distance obtained through ranging.

When ranging is performed by using the power line communication technology, a communication band, for example, 0.7 megahertz (MHz) to 3 MHz, may be used to send a communication frame between two power line communication modules for ranging. The communication frame uses an orthogonal frequency-division multiplexing (OFDM) signal, and has a large peak-to-average ratio (PAR). Therefore, the communication frame has low transmit power within a linear range of a power amplifier, and has poor communication efficiency. As a result, receive failures or receive errors of some communication frames exist.

SUMMARY

Embodiments of this disclosure provide an inter-node ranging method and an apparatus, so that communication can be performed by using sequences during inter-node ranging, thereby improving communication efficiency.

To achieve the foregoing objectives, the following technical solutions are used in embodiments of this disclosure.

According to a first aspect, an embodiment of this disclosure provides an inter-node ranging method. The method includes a first node that sends a plurality of first sequences to a second node, where the sequence is a string of periodic signals cyclically generated by a transmitter (sequence generator), the first node receives a plurality of second delayed sequences from the second node, the first node determines a first phase difference between the plurality of first sequences and the plurality of second delayed sequences, and the first node determines a distance between the first node and the second node based on the first phase difference.

In this way, in this disclosure, sequences are transmitted, so that a first node can determine a distance between the first node and a second node based on a phase difference between sequences sent by the first node and sequences received by the first node. Compared with other technologies in which a communication frame is used to perform ranging, the communication frame has a large PAR, resulting in low transmit power within a linear range of a power amplifier and poor communication efficiency. However, because the sequence has a small PAR, and has high transmit power within the linear range of the same power amplifier, communication efficiency can be improved, so that ranging precision is higher, a ranging error is smaller, and a structure of a ranging device is simplified.

In a possible design, the plurality of second delayed sequences are a plurality of sequences that are obtained through a channel delay on a plurality of second sequences and that are sent by the second node.

In a possible design, the second sequence is obtained by shifting a local first sequence by the second node based on a first delayed sequence, the first delayed sequence is a sequence received by the second node, the local first sequence is a sequence generated by the second node, and the local first sequence is the same as the first sequence. In this way, because the first delayed sequence received by the second node is a sequence obtained through a channel delay, and sequence distortion occurs, the second node cannot directly send the received first delayed sequence to the first node, and should shift the local first sequence based on the first delayed sequence. The second sequence obtained through shifting by the second node is a sequence aligned (synchronized) with the first delayed sequence, in other words, the second sequence can be represented as a sequence obtained from the first sequence after one channel delay. Therefore, the second node sends the second sequence, so that the second delayed sequence received by the first node can be represented as a sequence obtained from the first sequence after two channel delays. In this way, the first node can accurately determine a round-trip distance between the first node and the second node based on the first phase difference obtained by using the second delayed sequence and the first sequence, thereby accurately determining the distance between the first node and the second node, and reducing a ranging error.

In a possible design, there is a residual phase difference between the second sequence and the first delayed sequence, and the method further includes that the first node receives the residual phase difference sent by the second node. That the first node determines a distance between the first node and the second node based on the first phase difference includes that the first node determines the distance between the first node and the second node based on the first phase difference and the residual phase difference. In this way, when the second node shifts the local first sequence based on the first delayed sequence, the obtained second sequence generally cannot be completely aligned with the first delayed sequence, and there is the residual phase difference (for example, a fractional phase difference) between the second sequence and the first delayed sequence. Therefore, the second node sends an unaligned residual phase difference to the first node, so that the first node determines the distance between the first node and the second node based on both the first phase difference and the residual phase difference, thereby making ranging more accurate and reducing a ranging error.

In a possible design, the second sequence is a local first sequence or a sequence obtained based on a local first sequence, the local first sequence is a sequence generated by the second node, and the local first sequence is the same as the first sequence. In this way, because the first delayed sequence received by the second node is a sequence obtained through a channel delay, and sequence distortion occurs, the second node cannot directly send the received first delayed sequence to the first node. The second node may use the local first sequence generated by the second node as the second sequence sent to the first node. Because the local first sequence is the same as the first sequence, the second delayed sequence received by the first node is represented as a sequence obtained from the local first sequence after one channel delay.

In a possible design, the method further includes that the first node receives a third phase difference sent by the second node, where the third phase difference is a phase difference between the local first sequence and a first delayed sequence, and the first delayed sequence is a sequence received by the second node. That the first node determines a distance between the first node and the second node based on the first phase difference includes that the first node determines the distance between the first node and the second node based on the first phase difference and the third phase difference. In this way, when sending the local first sequence generated by the second node as the second sequence to the first node, the second node further sends the determined third phase difference between the first sequence and the first delayed sequence to the first node. In this way, the first node can determine the distance between the first node and the second node based on the first phase difference between the second delayed sequence and the first sequence and the third phase difference between the first sequence and the first delayed sequence that are received, thereby making ranging more accurate and reducing a ranging error.

In a possible design, that the first node determines a first phase difference between the plurality of first sequences and the plurality of second delayed sequences includes that the first node splices the plurality of first sequences into a first long sequence based on an order of sending the plurality of first sequences, splices the plurality of second delayed sequences into a second long sequence based on an order of receiving the plurality of second delayed sequences, and obtains the first phase difference between the plurality of first sequences and the plurality of second delayed sequences based on the first long sequence and the second long sequence. In a possible design, that the first node determines a first phase difference between the plurality of first sequences and the plurality of second delayed sequences includes that the first node obtains the first phase difference between the plurality of first sequences and the plurality of second delayed sequences based on an $N^{th}$ first sequence in the plurality of first sequences sent by the first node and an $N^{th}$ second delayed sequence in the plurality of second delayed sequences received by the first node, where N is an integer greater than or equal to 1. In a possible design, after a first node sends a plurality of first sequences to a second node, the method further includes that the first node sends a plurality of third sequences to the second node, where the plurality of third sequences indicate the second node to send sequences to the first node after receiving a plurality of third delayed sequences, and the plurality of third delayed sequences are a plurality of sequences that are obtained through a channel delay on the plurality of third sequences and that are sent by the first node. In this way, the first node sends the plurality of third sequences to the second node, so that when receiving the third sequences, the second node can prepare for sending the sequences to the first node, thereby reducing ranging time.

In a possible design, before a first node sends a plurality of first sequences to a second node, the method further includes that the first node sends sequence information of the first sequence to the second node, where the sequence information of the first sequence is used by the first node or the second node to generate the first sequence. In this way, the first node sends the sequence information of the first sequence to the second node, so that the first node and the second node generate a same first sequence, thereby improving ranging accuracy.

In a possible design, before the first node receives a plurality of second delayed sequences, the method further includes that the first node sends a sequence correspondence to the second node, where the sequence correspondence is used by the second node to determine, based on the sequence correspondence, a sequence that has a same sequence structure as the second sequence. In this way, the first node sends the sequence correspondence to the second node, so that the first node and the second node can perform sequence conversion based on a same sequence correspondence. In this way, the first node and the second node can learn sequences sent by each other, thereby improving ranging precision.

In a possible design, that the first node determines a first phase difference between the plurality of first sequences and the plurality of second delayed sequences further includes that the first node converts, based on a sequence correspondence, the plurality of first sequences into a plurality of first converted sequences that have a same sequence structure as the second sequence, and the first node obtains the first phase difference based on the plurality of first converted sequences and the plurality of second delayed sequences.

In a possible design, the first sequence and the second delayed sequence are any one of the following sequences: a binary pseudo-random noise sequence, a multi-phase pseudo-random noise sequence, a Frank sequence, or a Zadoff-Chu sequence. In this way, a sequence in this disclosure has a good autocorrelation, so that the first node or the second node can also accurately determine, based on a sequence obtained through a channel delay, whether the sequence is a to-be-received sequence, thereby improving a correct receiving rate of the sequence, and making ranging more precise.

According to a second aspect, an embodiment of this disclosure provides an inter-node ranging method. The method includes a second node that receives a plurality of first delayed sequences from a first node, where the plurality of first delayed sequences are a plurality of sequences that are obtained through a channel delay on a plurality of first sequences and that are sent by the first node, and the second node sends a plurality of second sequences to the first node, where the plurality of second sequences are used by the first node to determine a distance between the first node and the second node. The sequence is a string of periodic signals cyclically generated by a transmitter (sequence generator).

In this way, in this disclosure, sequences are transmitted, so that a second node sends a plurality of second sequences to a first node. In this way, the first node can determine a distance between the first node and the second node based on a phase difference between sequences received by the first node and sequences sent by the first node. Compared with other technologies in which a communication frame is used to perform ranging, the communication frame has a large PAR, resulting in low transmit power within a linear range of a power amplifier and poor communication efficiency.

However, because the sequence has a small PAR, and has high transmit power within the linear range of the power amplifier, communication efficiency can be improved, so that ranging precision is higher, a ranging error is smaller, and a structure of a ranging device is simplified.

In a possible design, after a second node receives a plurality of first delayed sequences, the method further includes that the second node shifts a local first sequence based on the first delayed sequence to obtain the second sequence, where the local first sequence is a sequence generated by the second node, and the local first sequence is the same as the first sequence. In this way, because the first delayed sequence received by the second node is a sequence obtained through a channel delay, and sequence distortion occurs, the second node cannot directly send the received first delayed sequence to the first node, and should shift the local first sequence based on the first delayed sequence. The second sequence obtained through shifting by the second node is a sequence aligned (synchronized) with the first delayed sequence, in other words, the second sequence can be represented as a sequence obtained from the first sequence after one channel delay. Therefore, the second node sends the second sequence, so that a second delayed sequence received by the first node can be represented as a sequence obtained from the first sequence after two channel delays. In this way, the first node can accurately determine a round-trip distance between the first node and the second node based on the first phase difference obtained by using the second delayed sequence and the first sequence, thereby accurately determining the distance between the first node and the second node, and reducing a ranging error.

In a possible design, there is a residual phase difference between the second sequence and the first delayed sequence, and the method further includes that the second node sends the residual phase difference to the first node, where the residual phase difference and the second sequence are used by the first node to determine the distance between the first node and the second node. In this way, when the second node shifts the local first sequence based on the first delayed sequence, the obtained second sequence generally cannot be completely aligned with the first delayed sequence, and there is the residual phase difference (for example, a fractional phase difference) between the second sequence and the first delayed sequence. Therefore, the second node sends an unaligned residual phase difference to the first node, so that the first node determines the distance between the first node and the second node based on both the first phase difference and the residual phase difference, thereby making ranging more accurate and reducing a ranging error.

In a possible design, the second sequence is a local first sequence or a sequence obtained based on a local first sequence, the local first sequence is a sequence generated by the second node, and the local first sequence is the same as the first sequence, and the method further includes that the second node sends a third phase difference between the local first sequence and the first delayed sequence to the first node, where the third phase difference and the second sequence are used by the first node to determine the distance between the first node and the second node. In this way, because the first delayed sequence received by the second node is a sequence obtained through a channel delay, and sequence distortion occurs, the second node cannot directly send the received first delayed sequence to the first node. The second node may use the local first sequence generated by the second node as the second sequence sent to the first node, and further send the determined third phase difference between the first sequence and the first delayed sequence to the first node. Because the local first sequence is the same as the first sequence, a second delayed sequence received by the first node is represented as a sequence obtained from the local first sequence after one channel delay. In this way, the first node can determine the distance between the first node and the second node based on the first phase difference between the second delayed sequence and the first sequence and the third phase difference between the first sequence and the first delayed sequence that are received, thereby making ranging more accurate and reducing a ranging error.

In a possible design, after a second node receives a plurality of first delayed sequences, the method further includes that the second node receives a plurality of third delayed sequences, where the plurality of third delayed sequences are used by the second node to send sequences to the first node after receiving the plurality of third delayed sequences, and the plurality of third delayed sequences are a plurality of sequences obtained through a channel delay on a plurality of third sequences sent by the first node. In this way, the second node receives the plurality of third delayed sequences from the first node, so that when receiving the third sequences, the second node can prepare for sending the sequences to the first node, thereby reducing ranging time.

In a possible design, before a second node receives a plurality of first delayed sequences, the method further includes that the second node receives sequence information of the first sequence sent by the first node, where the sequence information of the first sequence is used by the first node or the second node to generate the first sequence. In this way, the second node receives the sequence information of the first sequence sent by the first node, so that the first node and the second node generate a same first sequence, thereby improving ranging accuracy.

In a possible design, before the second node sends a plurality of second sequences to the first node, the method further includes that the second node receives a sequence correspondence sent by the first node, and the second node determines the second sequence based on the sequence correspondence. In this way, the second node receives the sequence correspondence sent by the first node, so that the first node and the second node can perform sequence conversion based on a same sequence correspondence. In this way, the first node and the second node can learn sequences sent by each other, thereby improving ranging precision.

In a possible design, the first sequence, the second sequence, the third sequence, the first delayed sequence, and the third delayed sequence are any one of the following sequences: a binary pseudo-random noise sequence, a multiphase pseudo-random noise sequence, a Frank sequence, or a Zadoff-Chu sequence. In this way, a sequence in this disclosure has a good autocorrelation, so that the first node or the second node can also accurately determine, based on a sequence obtained through a channel delay, whether the sequence is a to-be-received sequence, thereby improving a correct receiving rate of the sequence, and making ranging more precise.

According to a third aspect, an embodiment of this disclosure provides an electronic device. The electronic device includes a transmitter configured to send a plurality of first sequences to a second node, a receiver configured to receive a plurality of second delayed sequences from the second node, the receiver, further configured to determine a first phase difference between the plurality of first sequences and the plurality of second delayed sequences, and a processor configured to determine a distance between a first node and the second node based on the first phase difference.

For beneficial effects achieved in the third aspect, refer to beneficial effects in the first aspect.

In a possible design, the plurality of second delayed sequences are a plurality of sequences that are obtained through a channel delay on a plurality of second sequences and that are sent by the second node.

In a possible design, the second sequence is obtained by shifting a local first sequence by the second node based on a first delayed sequence, the first delayed sequence is a sequence received by the second node, the local first sequence is a sequence generated by the second node, and the local first sequence is the same as the first sequence.

In a possible design, there is a residual phase difference between the second sequence and the first delayed sequence, and the electronic device further includes a communication interface configured to receive the residual phase difference sent by the second node, and the processor, further configured to determine the distance between the first node and the second node based on the first phase difference and the residual phase difference.

In a possible design, the second sequence is a local first sequence or a sequence obtained based on a local first sequence, the local first sequence is a sequence generated by the second node, and the local first sequence is the same as the first sequence.

In a possible design, the communication interface is further configured to receive a third phase difference sent by the second node, where the third phase difference is a phase difference between the local first sequence and a first delayed sequence, and the first delayed sequence is a sequence received by the second node, and the processor is further configured to determine the distance between the first node and the second node based on the first phase difference and the third phase difference.

In a possible design, the receiver is further configured to splice the plurality of first sequences into a first long sequence based on an order of sending the plurality of first sequences, splice the plurality of second delayed sequences into a second long sequence based on an order of receiving the plurality of second delayed sequences, and obtain the first phase difference between the plurality of first sequences and the plurality of second delayed sequences based on the first long sequence and the second long sequence.

In a possible design, the receiver is further configured to obtain the first phase difference between the plurality of first sequences and the plurality of second delayed sequences based on an N first sequence in the plurality of first sequences sent by the transmitter and an $N^{th}$ second delayed sequence in the plurality of second delayed sequences received by the receiver, where N is an integer greater than or equal to 1.

In a possible design, the transmitter is further configured to send a plurality of third sequences to the second node, where the plurality of third sequences indicate the second node to send sequences to the first node after receiving a plurality of third delayed sequences, and the plurality of third delayed sequences are a plurality of sequences obtained through a channel delay on the plurality of third sequences sent by the transmitter.

In a possible design, the communication interface is further configured to send sequence information of the first sequence to the second node, where the sequence information of the first sequence is used by the first node or the second node to generate the first sequence.

In a possible design, the communication interface is further configured to send a sequence correspondence to the second node, where the sequence correspondence is used by the second node to determine, based on the sequence correspondence, a sequence that has a same sequence structure as the second sequence.

In a possible design, the receiver is further configured to convert, based on the sequence correspondence, the plurality of first sequences into a plurality of first converted sequences that have a same sequence structure as the second sequence, and the receiver is further configured to obtain the first phase difference based on the plurality of first converted sequences and the plurality of second delayed sequences.

In a possible design, the first sequence and the second delayed sequence are any one of the following sequences: a binary pseudo-random noise sequence, a multi-phase pseudo-random noise sequence, a Frank sequence, or a Zadoff-Chu sequence.

According to a fourth aspect, an embodiment of this disclosure provides an electronic device. The electronic device includes a receiver configured to receive a plurality of first delayed sequences from a first node, where the plurality of first delayed sequences are a plurality of sequences that are obtained through a channel delay on a plurality of first sequences and that are sent by the first node, and a transmitter configured to send a plurality of second sequences to the first node, where the plurality of second sequences are used by the first node to determine a distance between the first node and a second node. For beneficial effects achieved in the fourth aspect, refer to beneficial effects in the second aspect.

In a possible design, the transmitter is further configured to shift a local first sequence based on the first delayed sequence to obtain the second sequence, where the local first sequence is a sequence generated by the second node, and the local first sequence is the same as the first sequence.

In a possible design, there is a residual phase difference between the second sequence and the first delayed sequence, and the electronic device further includes a communication interface configured to send the residual phase difference to the first node, where the residual phase difference and the second sequence are used by the first node to determine the distance between the first node and the second node.

In a possible design, the second sequence is a local first sequence or a sequence obtained based on a local first sequence, the local first sequence is a sequence generated by the second node, and the local first sequence is the same as the first sequence, and the communication interface is further configured to send a third phase difference between the local first sequence and the first delayed sequence to the first node, where the third phase difference and the second sequence are used by the first node to determine the distance between the first node and the second node.

In a possible design, the receiver is further configured to receive a plurality of third delayed sequences, where the plurality of third delayed sequences are used by the second node to send sequences to the first node after receiving the plurality of third delayed sequences, and the plurality of third delayed sequences are a plurality of sequences obtained through a channel delay on a plurality of third sequences sent by the first node.

In a possible design, the communication interface is further configured to receive sequence information of the first sequence sent by the first node, where the sequence information of the first sequence is used by the first node or the second node to generate the first sequence.

In a possible design, the communication interface is further configured to receive a sequence correspondence sent by the first node, and the transmitter is further config-ured to determine the second sequence based on the sequence correspondence.

In a possible design, the first sequence, the second sequence, the third sequence, the first delayed sequence, and the third delayed sequence are any one of the following sequences: a binary pseudo-random noise sequence, a multi-phase pseudo-random noise sequence, a Frank sequence, or a Zadoff-Chu sequence.

According to a fifth aspect, an embodiment of this dis-closure provides an electronic device. The electronic device is the electronic device according to the third aspect and the fourth aspect. The electronic device includes one or more communication interfaces and one or more processors. The communication interface and the processor are intercon-nected by using a line. The processor receives computer instructions from a memory of the electronic device through the communication interface and executes the computer instructions.

According to a sixth aspect, a computer-readable storage medium is provided, including computer instructions. When the computer instructions are run on a computer or a processor, the computer or the processor is enabled to perform the method according to the first aspect and any possible design in the first aspect or the method according to the second aspect and any possible design in the second aspect.

According to a seventh aspect, a computer program product is provided, where the computer program product includes computer instructions. When the computer instruc-tions are run on a computer or a processor, the computer or the processor is enabled to perform the method according to the first aspect and any possible design in the first aspect or the method according to the second aspect and any possible design in the second aspect.

For beneficial effects corresponding to the other aspects, refer to descriptions of beneficial effects in the method aspects. Details are not described herein again.

BRIEF DESCRIPTION OF DRAWINGS

FIG. 4 is a schematic flowchart of an inter-node ranging method according to an embodiment of this disclosure;

FIG. 5 is a schematic diagram of a sequence structure according to an embodiment of this disclosure;

FIG. 7 is a schematic diagram of a sequence structure according to an embodiment of this disclosure;

DESCRIPTION OF EMBODIMENTS

Figure 1:
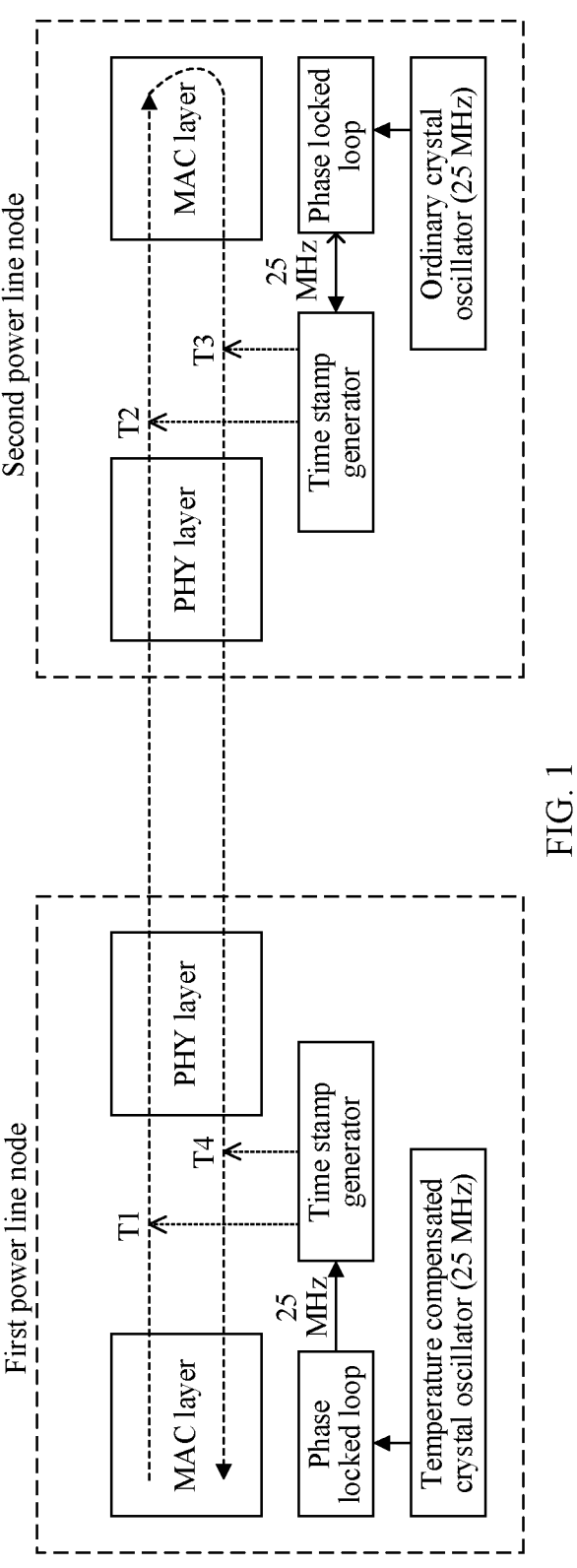
FIG. 1 is a schematic flowchart of performing power line communication ranging.

For ease of understanding, descriptions of some concepts related to embodiments of this disclosure are provided for reference. Details are described as follows.

Network time basement (NTB): In carrier communica-tion, all devices in a network are synchronized with a common clock, where the clock is the NTB. For example, in power line carrier communication, NTB synchronization (using the NTB as a basement) may be used to enable clock frequencies of all nodes to be close to each other and keep time synchronization.

Phase-locked loop (PLL): A loop that locks a phase, where an external input reference signal is used to control a frequency and a phase of an oscillation signal in the loop, so that a frequency of an output signal can automatically trace a frequency of the input signal.

Sequence: A string of periodic signals cyclically gener-ated by a sequence generator. In embodiments of this disclosure, the sequence may be a pseudo-random noise sequence, for example, a binary pseudo-random noise sequence, a multi-phase pseudo-random noise sequence, a complex number sequence, a Frank sequence, a Zadoff-Chu sequence, or another sequence with good autocorrelation. This is not limited in this disclosure.

PAR: A measurement parameter of a waveform, equal to a ratio obtained by dividing an amplitude of the waveform by a valid value (a root mean square (RMS) value). A larger PAR of a signal indicates lower transmit power within a linear range of a power amplifier, resulting in poor commu-nication efficiency. On the contrary, a smaller PAR of the signal indicates higher transmit power within the linear range of the same power amplifier, so that communication efficiency can be improved.

Sequence correlation analysis (correlation operation): Two sequences are input into a program for performing a correlation operation, and whether there is a correlation between the two sequences is determined based on whether there is a correlation peak in an obtained waveform diagram. This is equivalent to determining whether there is a cross-correlation between the two sequences, in other words, whether the other sequence can be obtained based on one sequence. For example, two sequences are a sequence 1 and a sequence 2, and the sequence 2 is obtained by shifting (performing a phase change on) the sequence 1. Therefore, the sequence 2 can be obtained based on the sequence 1, in other words, there is a cross-correlation between the sequence 1 and the sequence 2, and there is a correlation peak after a correlation operation is performed on the sequence 1 and the sequence 2. In addition, a phase differ-ence between the two sequences may be determined based on a location of the correlation peak in the waveform diagram. Generally, for sequences with a good autocorrela-tion, a sequence obtained by shifting and a sequence before shifting have a cross-correlation.

Sequence alignment (synchronization): Two sequences are two identical sequences, which is sequence alignment, also referred to as sequence synchronization. For example, there is a phase difference between a sequence 1 and a sequence 2. The sequence 1 is shifted to eliminate the phase difference between the sequence 1 and the sequence 2, so that the sequence 1 and the sequence 2 can be aligned, so that the sequence 1 and the sequence 2 are synchronized.

Sample point: If a sequence is [C1 C2 C3 C4 C5], C1 is a sample point, namely, a sample point C1, C2 is a sample point, namely, a sample point C2, C3 is a sample point, namely, a sample point C3, C4 is a sample point, namely, a sample point C4, and C5 is a sample point, namely, a sample point C5.

The following describes the technical solutions in embodiments of this disclosure with reference to the accompanying drawings in embodiments of this disclosure. In description in embodiments of this disclosure, "/" means "or" unless otherwise specified. For example, A/B may represent A or B. In this specification, "and/or" describes only an association relationship for describing associated objects and represents that three relationships may exist. For example, A and/or B may represent the following three cases: only A exists, both A and B exist, and only B exists. In addition, in the descriptions in embodiments of this disclosure, "a plurality of" means two or more.

The terms "first" and "second" mentioned below are merely intended for a purpose of description, and shall not be understood as an indication or implication of relative importance or implicit indication of the number of indicated technical features. Therefore, a feature defined by "first" or "second" can explicitly or implicitly include one or more features. In the descriptions of embodiments, unless otherwise specified, "a plurality of" means two or more. "At least one of the following items (pieces)" or a similar expression thereof refers to any combination of these items, including any combination of singular items (pieces) or plural items (pieces). For example, at least one of a, b, or c may indicate a, b, c, a and b, a and c, b and c, or a, b, and c, where a, b, and c may be singular or plural.

During power line communication ranging, a communication band, for example, 0.7 MHz to 3 MHz, is generally used to send a communication frame between two communication modules that communicate through a power line for ranging. As shown in FIG. 1, a power line node includes a time stamp generator. Generally, a temperature compensate crystal oscillator (TCXO) is used to generate a 25 MHz clock frequency and send the clock frequency to a phase locked loop. After phase locking by the phase locked loop, the clock frequency is sent to the time stamp generator, so that the time stamp generator adds a time stamp to a communication frame from a medium access control (MAC) layer between the MAC layer and a physical layer (PHY) to obtain a communication frame that is to-be-sent and that has been added with a time stamp. During ranging, it is assumed that, at moment T1, a first power line node uses the time stamp generator to add a basement time stamp (BTS), denoted as BTStx1, to a communication frame based on an NTB, and sends the communication frame after modulation at the PHY layer is completed. A second power line node receives the communication frame, and reads local NTB time, denoted as NTBrx2, at moment T2 after modulation at a PHY layer is completed. Then, at moment T3, the second power line node uses the time stamp generator to add a basement time stamp, denoted as BTStx2, to a responding communication frame based on the NTB, and sends the responding communication frame after the modulation at the PHY layer is completed. The first power line node receives the responding communication frame, and reads local NTB time, denoted as NTBrx1, at moment T4 after the demodulation at the PHY layer is completed. According to the foregoing method, it may be calculated based on the recorded time stamps that, a transmission delay of the communication frame=(NTBrx2-BTStx1+NTBrx1-BTStx2)/(2×25M), so that it may be calculated based on the transmission delay that, a distance between the first power line node and the second power line node=the transmission delay×a speed of light.

In the foregoing process, a bandwidth of a communication band used for power line communication is generally small. A ranging error equals the speed of light divided by a bandwidth, for example, when a 3 MHz bandwidth is used to send a communication frame, a ranging error is that $(3×10^8)/(3×10^6)=100$ meters (m). Therefore, a smaller bandwidth indicates a larger ranging error, namely, lower ranging precision. An error between a distance calculated by using the foregoing method and an actual distance is about 100 meters. In addition, during ranging, network clock synchronization is performed, and a time stamp generator is used to add a time stamp to a communication frame. In this way, during implementation, a structure of a ranging device (node) is complex, and a ranging solution is complex. In addition, the communication frame generally uses an OFDM signal, and has a large PAR, resulting in low transmit power within a linear range of a power amplifier. As a result, receive failures or receive errors of some communication frames exist, and communication efficiency is poor. In other words, when a communication frame is used, ranging precision is low, and an error is large.

Therefore, this disclosure provides an inter-node ranging method. The method may be applied to an electronic device, for example, integrated into a chip. Considering that in other technologies, when a communication frame is used, there are problems, for example, low ranging precision, a large error, and a complex structure of a ranging device, in this disclosure, during inter-node ranging, sequences are transmitted, to determine a phase difference between sequences sent by a node and sequences received by the node for ranging. Because a sequence used in embodiments of this disclosure has a small PAR, and has high transmit power within a linear range of a power amplifier, communication efficiency can be improved, so that ranging precision can be improved, and a structure of a ranging device can be simplified.

Figures 2A, 2B, 3:
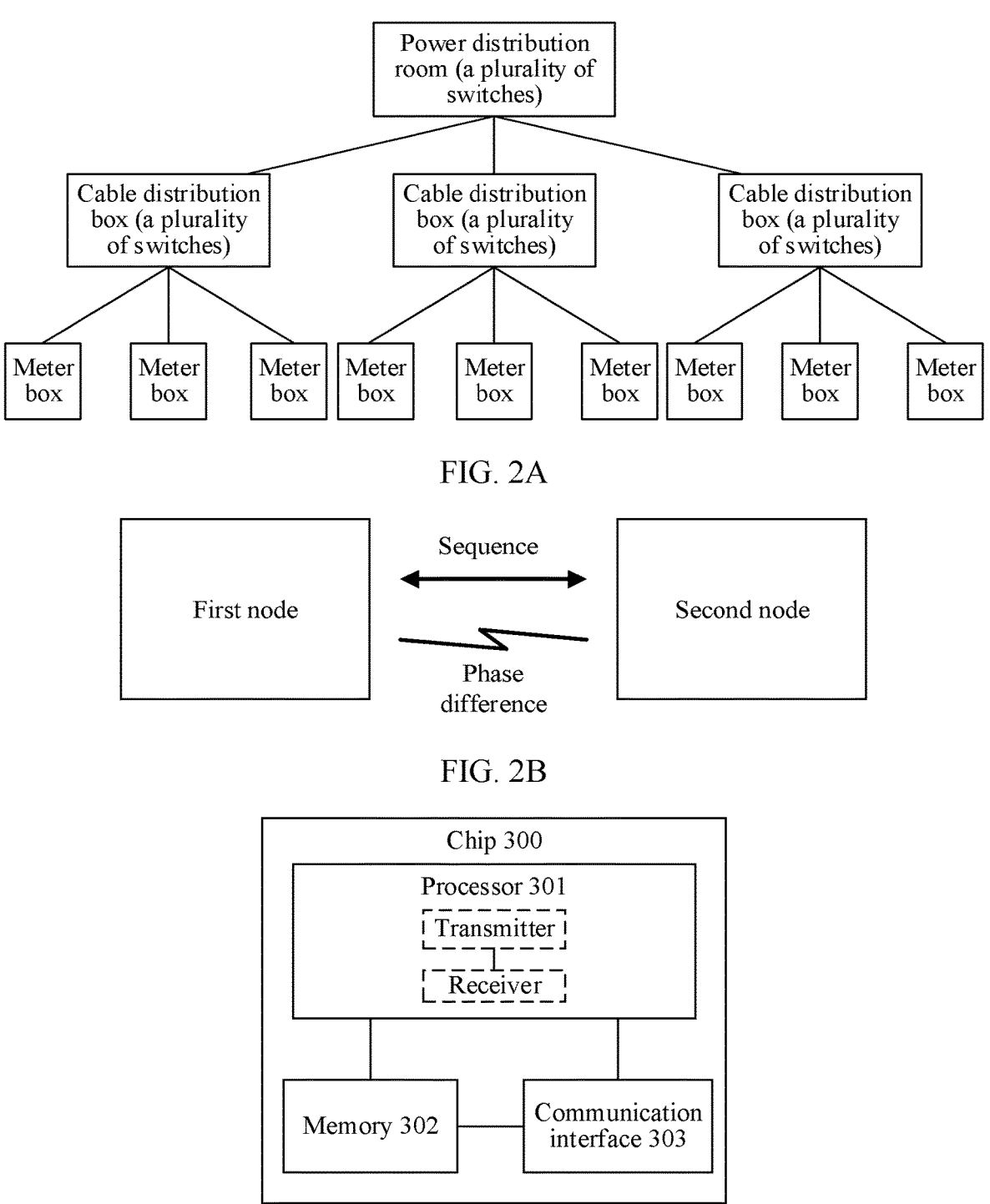
FIG. 2A is a schematic diagram of an application scenario of an inter-node ranging method according to an embodi-ment of this disclosure.
FIG. 2B is a schematic diagram of an application scenario of an inter-node ranging method according to an embodi-ment of this disclosure.
FIG. 3 is a schematic diagram of a hardware structure of an electronic device according to an embodiment of this disclosure.

The method in embodiments of this disclosure may be applied to an inter-node ranging scenario, for example, may be applied to an inter-power line node ranging scenario. As shown in FIG. 2A, the scenario includes a power distribution room, a plurality of cable distribution boxes connected to the power distribution room through power lines, and a plurality of meter boxes connected to each cable distribution box through power lines. The power distribution room and the cable distribution box include a plurality of switches, each meter box includes one switch, each switch is equipped with a power line node, and the power line node may be used for power line communication. Power line ranging may be performed through mutual communication between two power line nodes, and a power line distance obtained through ranging may be understood as a power line length between the two power line nodes. The power line distance can be used to determine whether a switch of the power line node belongs to a power distribution room, a cable distribution box, or a meter box. For example, if a distance between two power line nodes is within a range of 5 meters, it may be considered that switches of the two power line nodes belong to switches in a same power distribution room. In this way, on a basis of determining a length of a power line between switches through ranging, a line loss of the power line may be determined based on the length of the power line.

It should be noted that, in addition to being applied to power line node ranging, the method in embodiments of this disclosure may be further applied to another inter-node ranging scenario. This is not limited in this disclosure. For example, the method in embodiments of this disclosure may be applied to a scenario in which wireless communication ranging is performed between two nodes. As shown in FIG. 2B, it is assumed that the scenario includes a first node and a second node, the first node and the second node may perform inter-node ranging by sending a sequence or sending a sequence and a phase difference, and a distance obtained through ranging is a straight-line distance between the two nodes.

When the method in embodiments of this disclosure is applied to an electronic device, FIG. 3 is a schematic diagram of a hardware structure of an electronic device. The electronic device may include a node in embodiments of this disclosure, namely, a chip, for example, a chip 300 in FIG. 3. The chip 300 may include a processor 301, a memory 302, a communication interface 303, and the like.

It may be understood that the schematic structure in this embodiment of this disclosure does not constitute a specific limitation on the chip 300. In some other embodiments of this disclosure, the chip 300 may include more or fewer components than those shown in the figure, or some components may be combined, or some components may be divided, or different component arrangements may be used. The components shown in the figure may be implemented by hardware, software, or a combination of software and hardware.

The processor 301 may include one or more processing units. For example, the processor 301 may include a graphics processing unit (GPU), a central processing unit (CPU), a neural network processor (NPU), and/or the like. Different processing units may be independent components, or may be integrated into one or more processors. In this embodiment of this disclosure, the chip 300 may alternatively include one or more processors 301. The processor 301 may include a transmitter, a receiver, and the like. The transmitter may be, for example, a sequence generator. The receiver may be, for example, a phase capturer.

The transmitter (sequence generator) may be configured to generate a sequence and send the sequence. In this embodiment of this disclosure, the transmitter (sequence generator) may be configured to periodically and cyclically generate a corresponding quantity of sequences based on sequence information stored in the memory 302, and send the generated sequences.

The receiver (phase capturer) may be configured to receive a sequence sent by an external device (node) and determine a phase difference between two sequences. In this embodiment of this disclosure, the receiver (phase capturer) may be configured to receive a sequence, and perform sequence correlation analysis (perform a correlation operation) on the sequence generated by the transmitter (sequence generator) and the sequence received by the receiver (phase capturer), to determine a correlation between the two sequences, and obtain a phase difference between the two sequences at the same time.

The processor 301 may be further configured to determine a distance based on the phase difference. In this embodiment of this disclosure, the processor 301 may be configured to determine a distance between two nodes based on one or more phase differences.

The processor 301 may be understood as a nerve center and a command center of the chip 300. An operation control signal may be generated based on an instruction operation code and a time-sequence signal, to implement control of fetching instructions and executing the instructions.

The memory 302 may be configured to store one or more computer programs, and the one or more computer programs include instructions. The processor 301 may run the foregoing instructions stored in the memory 302, so that the chip 300 performs the method, data storage, and the like provided in embodiments of this disclosure. The memory 302 may include a code storage area and a data storage area. The data storage area may store data created in a process of using the chip 300, and the like. In addition, the internal memory 302 may include a high-speed random-access memory (RAM), or may include a non-volatile memory, for example, one or more magnetic disk storage components, a flash memory component, or a universal flash storage (UFS). In this embodiment of this disclosure, for example, the memory 302 may be configured to store sequence information of a sequence, a sequence correspondence, and the like.

The communication interface 303 may be configured to communicate with an external device, and may be one or more components integrating at least one communication processing module. In this embodiment of this disclosure, the communication interface 303 may communicate with a communication interface of another node.

Based on the electronic device provided in this disclosure, the following describes, with reference to the accompanying drawings, a process in which a distance between nodes may be calculated by transmitting sequences and calculating a phase difference between sequences sent by a node and sequences received by the node during inter-power line node ranging in the inter-node ranging method provided for the electronic device in this disclosure by using an example in which the electronic device is a power line node.

As shown in FIG. 4, an embodiment of this disclosure provides an inter-node ranging method. By using an example in which an electronic device includes a first node and a second node, and the first node and the second node include a structure of the chip shown in FIG. 3, the method includes the following steps.

Step 400: The first node sends a plurality of first sequences to the second node.

In some embodiments, the first node may periodically and cyclically generate the first sequences, and periodically send the first sequences to the second node based on an order of generating the first sequences. Further, a transmitter of the first node may periodically and cyclically generate the first sequences based on sequence information of the first sequences, and periodically send the first sequences to the second node based on the order of generating the first sequences.

A periodicity length of a sequence represents a quantity of sample points in the sequence, and a periodicity quantity of the sequence represents a quantity of sequences. For example, if the periodicity length of the sequence is m, the sequence may be represented as [C1 C2 C3 . . . Cm]. If the periodicity quantity of the sequence is 4, it represents that four sequences are periodically and cyclically generated, that is, [C1 C2 C3 . . . Cm C1 C2 C3 . . . Cm C1 C2 C3 . . . Cm C1 C2 C3 . . . Cm].

For example, as shown in FIG. 5, it is assumed that a periodicity length of the first sequence is 7, and a periodicity quantity is 4. In this case, the first sequence is [C1 C2 C3 C4 C5 C6 C7]. The first node cyclically sends four [C1 C2 C3 C4 C5 C6 C7] to the second node based on the periodicity quantity of the first sequence. In other words, a format of the plurality of first sequences sent by the first node is [C1 C2 C3 C4 C5 C6 C7 C1 C2 C3 C4 C5 C6 C7 C1 C2 C3 C4 C5 C6 C7 C1 C2 C3 C4 C5 C6 C7].

Step 401: The first node receives a plurality of second delayed sequences from the second node.

The plurality of second delayed sequences are a plurality of sequences that are obtained through a channel delay on the plurality of sequences and that are sent by the second node to the first node. Further, a receiver of the first node may receive the plurality of second delayed sequences from the second node.

For example, as shown in FIG. 5, it is assumed that the first sequence sent by the first node is [C1 C2 C3 C4 C5 C6 C7], and the second delayed sequence received by the first node is [C2 C3 C4 C5 C6 C7 C1]. In this case, [C2 C3 C4 C5 C6 C7 C1] may be understood as being obtained from [C1 C2 C3 C4 C5 C6 C7] after two phase changes. In other words, [C2 C3 C4 C5 C6 C7 C1] is obtained through a channel delay on [C1 C2 C3 C4 C5 C6 C7] in round-trip transmission between the first node and the second node.

Step 402: The first node determines a first phase difference between the plurality of first sequences and the plurality of second delayed sequences.

The first node performs a correlation operation on the plurality of first sequences sent to the second node and the plurality of second delayed sequences received by the first node, to obtain the first phase difference between the plurality of first sequences and the plurality of second delayed sequences. Further, the receiver of the first node may determine the first phase difference between the plurality of first sequences and the plurality of second delayed sequences.

For example, the first node performs the correlation operation on the plurality of first sequences and the plurality of second delayed sequences to obtain a waveform diagram, and determines the first phase difference between the plurality of first sequences and the plurality of second delayed sequences by using a location of a correlation peak in the waveform diagram. As shown in FIG. 5, it is assumed that the first node sends four first sequences to the second node, and the first node receives four second delayed sequences. In this case, a phase difference between the plurality of (four) second delayed sequences [C2 C3 C4 C5 C6 C7 C1 C2 C3 C4 C5 C6 C7 C1 C2 C3 C4 C5 C6 C7 C1 C2 C3 C4 C5 C6 C7 C1] received by the first node and the plurality of (four) first sequences [C1 C2 C3 C4 C5 C6 C7 C1 C2 C3 C4 C5 C6 C7 C1 C2 C3 C4 C5 C6 C7 C1 C2 C3 C4 C5 C6 C7] sent by the first node that is calculated by performing a correlation operation is 6 (to be specific, a sample point 1 in the first sequence is shifted rightward by 6 beats and obtains a location in the second delayed sequence). Therefore, it may be determined that the first phase difference between the plurality of second delayed sequences and the plurality of first sequences is 6.

Step 403: The first node determines a distance between the first node and the second node based on the first phase difference.

The first phase difference between the plurality of first sequences and the plurality of second delayed sequences is a phase difference for determining a round-trip distance between the first node and the second node. The first node can determine the distance between the first node and the second node based on the first phase difference. Further, a processor of the first node may determine the distance between the first node and the second node based on the first phase difference.

For example, the first node can determine, based on a sampling rate (namely, a bandwidth of sequences) of sent sequences and the first phase difference, time between the time at which the first node starts to send the sequences and the time at which the first node starts to receive sequences. For example, if the sampling rate of the sequences is 50 MHz and the first phase difference is 3, the time may be determined as 60 nanoseconds based on that the time equals the phase difference divided by the sampling rate. Then, the first node can determine the round-trip distance between the first node and the second node based on the determined time and a speed of light. For example, if the time is 60 nanoseconds, the round-trip distance may be determined as 18 meters based on that the round-trip distance equals the time multiplied by the speed of light. Therefore, the distance between the first node and the second node is that 18/2 m, or 9 m. In other words, a formula for determining the distance between the first node and the second node based on the first phase difference is [(the first phase difference/the sampling rate)×the speed of light]/2.

In this way, the inter-node ranging method provided in this embodiment of this disclosure may be applied to the electronic device, for example, a chip. During inter-node ranging, sequences are transmitted to determine a phase difference between sequences sent by a node and sequences received by the node, to determine a distance between nodes. Because the sequence has a small PAR, and has high transmit power within a linear range of a power amplifier, communication efficiency can be improved, so that ranging precision is higher, a ranging error is smaller, and a structure of a ranging device is simplified.

Figure 6:
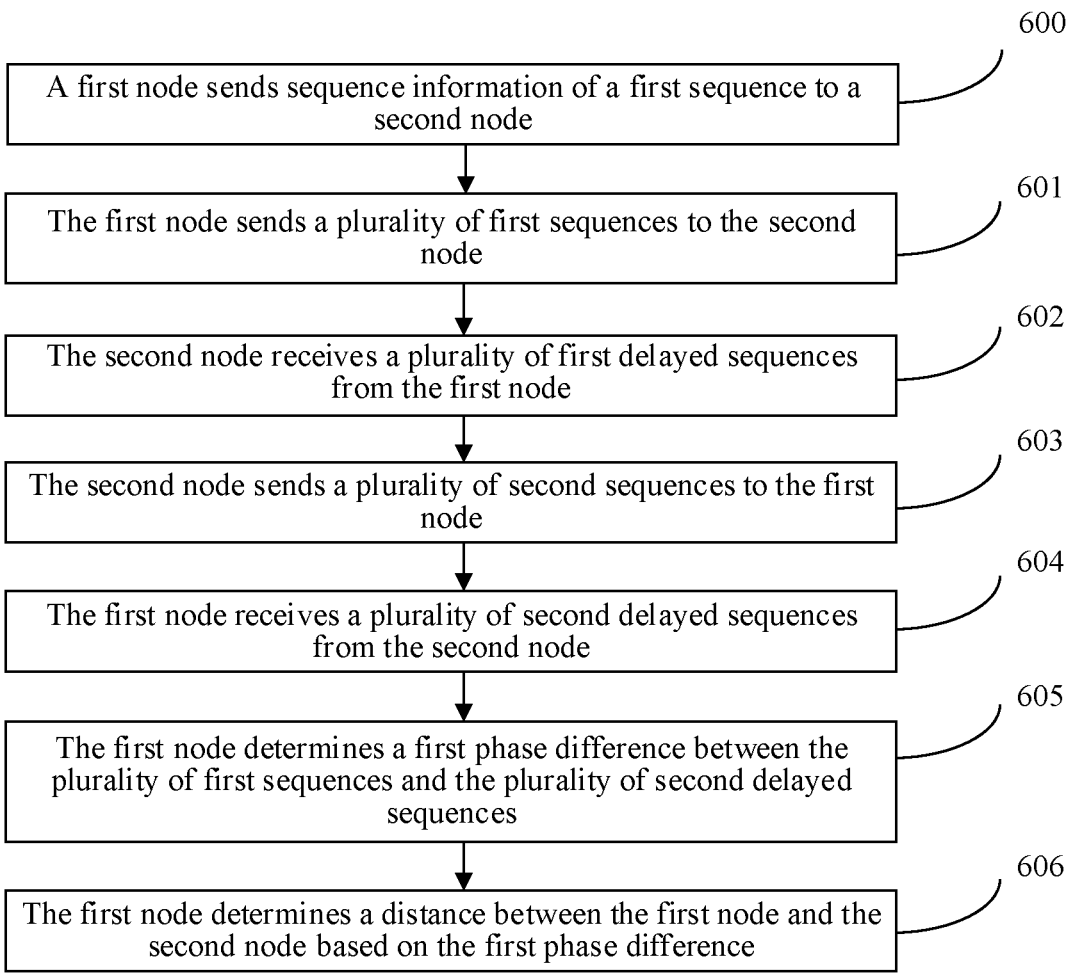
FIG. 6 is a schematic flowchart of an inter-node ranging method according to an embodiment of this disclosure.

As shown in FIG. 6, an embodiment of this disclosure provides an inter-node ranging method. The method may further include the following steps.

Step 600: A first node sends sequence information of a first sequence to a second node.

The first node and the second node may be power line nodes. The sequence information of the first sequence is used by the first node or the second node to generate a first sequence. The sequence information of the first sequence may include sequence parameters for determining the first sequence. For example, if the first sequence is a pseudo-random noise sequence, the sequence information of the first sequence includes a level, a periodicity, and a feedback coefficient of the first sequence. The first node or the second node may generate the first sequence based on the level, the periodicity, and the feedback coefficient of the first sequence. The first sequence may be the pseudo-random noise sequence, for example, a binary pseudo-random noise sequence, a multi-phase pseudo-random noise sequence, a complex sequence, a Frank sequence, or a Zadoff-Chu sequence. Further, the first node may send the sequence information of the first sequence to the second node through a communication interface.

For example, the first node sends the sequence information of the first sequence to the second node, and the second node receives the sequence information of the first sequence sent by the first node. Therefore, the first node and the second node can generate a same first sequence based on the sequence information of the first sequence.

Step 601: The first node sends a plurality of first sequences to the second node.

For details of step 601, refer to description of step 400. Details are not described herein again.

In some optional embodiments, after step 601, the following further exists.

Step 601*a*: The first node sends a plurality of third sequences to the second node.

The plurality of third sequences indicate the second node to send sequences to the first node after receiving a plurality of third delayed sequences, and the plurality of third delayed sequences are a plurality of sequences that are obtained through a channel delay on the plurality of third sequences and that are sent by the first node. It may be understood that, the first node first sends the plurality of first sequences, and then sends the plurality of third sequences. That the second node receives the third delayed sequence represents that the first node ends sending the first sequence, and after the first node ends sending the third sequence, the second node may send a sequence to the first node. In this way, the second node sends the sequence to the first node after the first node stops sending the sequence, thereby shortening ranging time. Further, a transmitter of the first node may send the plurality of third sequences to the second node.

In addition, there is no cross-correlation between the third sequence and the first sequence, or a result after a correlation operation is performed is a negative peak. Therefore, the second node can accurately distinguish the third delayed sequence and the first delayed sequence. For example, the third sequence may be a sequence obtained by negating the first sequence, a sequence obtained by combining the first sequence and another sequence, a sequence whose sequence structure is different from that of the first sequence, or the like. This is not limited in this disclosure.

That there is a cross-correlation between two sequences may be understood as that there is a correlation relationship between the two sequences, and the other sequence can be obtained based on one sequence. In this way, that there is no cross-correlation between two sequences may be understood as that there is no correlation relationship between the two sequences, and the other sequence cannot be obtained based on one sequence. Therefore, after the correlation operation is performed on the two sequences, there is no correlation peak.

In some optional embodiments, before step 601*a*, the first node may send sequence information of the third sequence to the second node, so that both the first node and the second node can generate a same third sequence based on the sequence information of the third sequence. Further, the first node may send the sequence information of the third sequence to the second node through the communication interface.

Step 602: The second node receives a plurality of first delayed sequences from the first node.

The plurality of first delayed sequences are a plurality of sequences obtained through a channel delay on the plurality of first sequences sent by the first node. It may also be understood that, in a process of transmitting the first sequence to the second node, the first sequence sent by the first node undergoes a channel delay in a power line transmission process. The channel delay causes a phase of the first sequence to change, and the first sequence obtained after the phase is changed is referred to as the first delayed sequence. Therefore, the first node sends the first sequence to the second node, but the second node receives the first sequence obtained after the phase is changed, namely, the first delayed sequence. Further, a receiver of the second node may receive the plurality of first delayed sequences from the first node.

For example, as shown in FIG. 7, it is assumed that a periodicity length of the first sequence is 7, a periodicity quantity is 4, and the first sequence is [C1 C2 C3 C4 C5 C6 C7]. In this case, the first delayed sequence may be [C5 C6 C7 C1 C2 C3 C4]. This is equivalent to a sequence obtained after the first sequence is cyclically shifted rightward by 3 beats. Compared with the phase of the first sequence, a phase of the first delayed sequence is delayed by 3 beats, in other words, a phase difference is 3. A format of the plurality of first delayed sequences received by the second node is [C5 C6 C7 C1 C2 C3 C4 C5 C6 C7 C1 C2 C3 C4 C5 C6 C7 C1 C2 C3 C4 C5 C6 C7 C1 C2 C3 C4].

That the second node determines that the plurality of first delayed sequences corresponding to the plurality of first sequences are received from the first node may be understood as that, the second node generates a local first sequence (where the local first sequence is a sequence that is the same as the first sequence and that is generated by the second node) when the first node sends the first sequence, and performs a correlation operation on a received sequence and the local first sequence. Because the first sequence (local first sequence) has a good autocorrelation, by determining whether there is a correlation peak after the correlation operation is performed on the found sequence and the local first sequence, it may be determined whether the received sequence is the first delayed sequence obtained through a channel delay on the first sequence.

In some optional embodiments, after step 602, the following further exists.

Step 602*a*: The second node receives a plurality of third delayed sequences.

The plurality of third delayed sequences are used by the second node to start to send sequences to the first node after receiving the plurality of third delayed sequences, and the plurality of third delayed sequences are a plurality of sequences obtained through a channel delay on a plurality of third sequences sent by the first node. It may be understood that, the second node first receives the plurality of first delayed sequences, and then receives the plurality of third delayed sequences. That the second node receives the third delayed sequence represents that the first node ends sending the first sequence. After the first node ends sending the third sequence, in other words, after the second node has received the plurality of third delayed sequences, the second node may start to send a sequence to the first node. In this way, the second node sends the sequence to the first node after the first node stops sending the sequence, thereby shortening ranging time. In addition, there is no cross-correlation between the third sequence and the first sequence, or a result after a correlation operation is performed is a negative peak. Therefore, the second node can accurately distinguish the third delayed sequence and the first delayed sequence. Further, a phase capturer of the second node may receive the plurality of third delayed sequences from the first node.

In some embodiments, after step 602, the second node further has the following two processing manners.

Manner 1:

Step 602*b*: The second node shifts the local first sequence based on the first delayed sequence to obtain a second sequence.

The local first sequence is a sequence generated by the second node based on the sequence information of the first sequence. Therefore, the local first sequence is the same as the first sequence. That the second node shifts the local first sequence based on the first delayed sequence may be understood as that the second node performs sequence alignment (synchronization) on the local first sequence and the first delayed sequence as much as possible. A specific process is as follows. The second node performs a correlation operation on the generated local first sequence on the received first delayed sequence to obtain a phase difference between the local first sequence and the first delayed sequence, the second node eliminates the phase difference between the local first sequence and the first delayed sequence as much as possible by shifting the local first sequence, and a sequence obtained after the second node shifts the local first sequence is the second sequence. The local first sequence and the first delayed sequence that are used by the second node to perform the correlation operation are generated or received by the second node in a same time period.

In most cases, costs consumed for completely aligning two sequences are high. Therefore, when the second node performs alignment on the local first sequence and the first delayed sequence, there may be a case in which the local first sequence is not completely aligned with the first delayed sequence. For example, when the phase difference between the local first sequence and the first delayed sequence is a decimal (for example, the phase difference is 3.5), when the second node shifts the local first sequence, the second node can shift only a phase difference of an integer part (for example, the phase difference of the integer part is 3), but a phase difference of a fractional part cannot be shifted (for example, the phase difference of the fractional part is 0.5). Therefore, there is a residual phase difference between the second sequence obtained after the second node shifts the local first sequence and the first delayed sequence.

The residual phase difference may be 0 or not 0. When the residual phase difference is not 0, the second sequence is not aligned with the first delayed sequence, and there is a residual phase difference between the second sequence and the first delayed sequence. The residual phase difference may be an integer or a decimal. This is not limited in this disclosure. When the residual phase difference is 0, the second sequence is aligned with the first delayed sequence, and there is no phase difference between the second sequence and the first delayed sequence.

Figure 8:
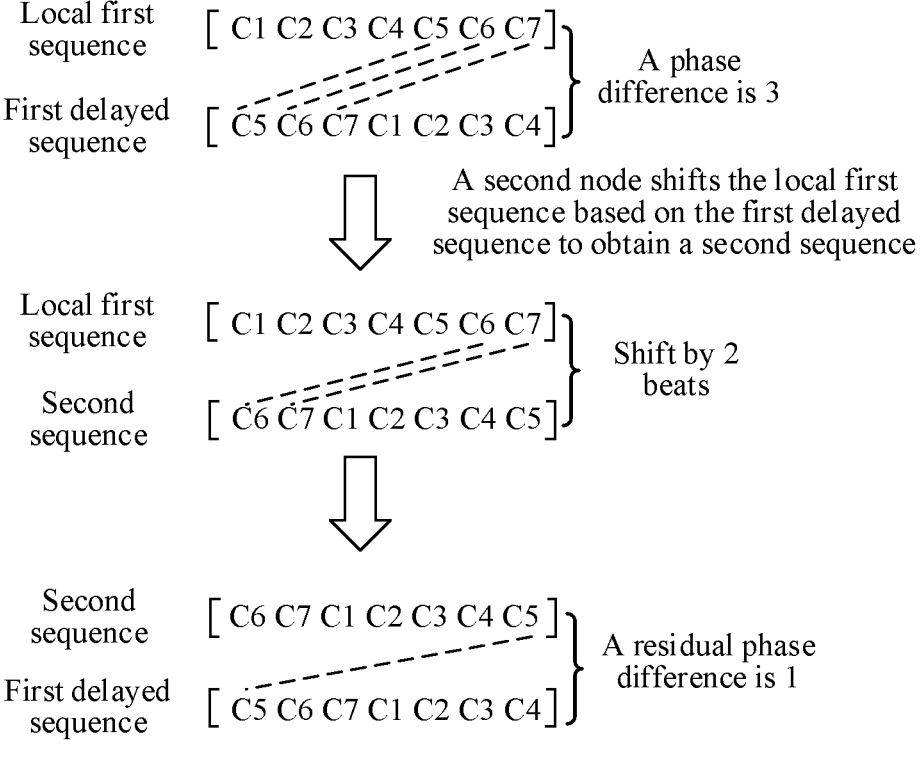
FIG. 8 is a schematic diagram of a sequence shift process according to an embodiment of this disclosure.

For example, the second node receives the first delayed sequence when generating the local first sequence, and performs a correlation operation on the local first sequence and the first delayed sequence. In FIG. 8, by using an example in which the residual phase difference is not 0, it is assumed that the local first sequence is [C1 C2 C3 C4 C5 C6 C7], the first delayed sequence is [C5 C6 C7 C1 C2 C3 C4], and the phase difference between the local first sequence and the first delayed sequence obtained through performing the correlation operation is 3. If the second sequence obtained after the second node shifts the local first sequence is [C6 C7 C1 C2 C3 C4 C5], it is equivalent to shifting by 2 beats, to be specific, a phase difference between the second sequence and the first delayed sequence is 1, and the residual phase difference is not 0. The foregoing shift process is a process in which the second node performs sequence alignment on the local first sequence and the first delayed sequence as much as possible, and the phase difference 1 between the second sequence and the first delayed sequence is the residual phase difference. If the second sequence obtained after the second node shifts the local first sequence is [C5 C6 C7 C1 C2 C3 C4], in this case, the second sequence is the same as the first delayed sequence, and the phase difference between the second sequence and the first delayed sequence is 0, to be specific, the second sequence is completely aligned with the first delayed sequence, and there is no residual phase difference.

When the residual phase difference is not 0, after step 602b, the following steps are further included.

Step 602c: The second node sends the residual phase difference to the first node. After step 602c, step 603 is performed.

The residual phase difference is used to enable the first node to determine a distance between the first node and the second node based on the second sequence and the residual phase difference that are sent by the second node. This is equivalent to that in step 605, the first node can determine the distance between the first node and the second node based on the second sequence and the residual phase difference that are sent by the second node. The second sequence is a sequence that is not completely aligned with the first delayed sequence. Further, the second node may send the residual phase difference to the first node through the communication interface.

When the residual phase difference is 0, to be specific, when the local first sequence can be completely aligned with the first delayed sequence after the second node shifts the local first sequence in step 602b, the second sequence obtained after the local first sequence is shifted is the first delayed sequence. In this way, in step 605, the first node can determine the distance between the first node and the second node based on the second sequence sent by the second node. Manner 2:

Step 602d: The second node obtains a third phase difference based on the local first sequence and the first delayed sequence.

The second node performs a correlation operation on the generated local first sequence and the received first delayed sequence, and an obtained phase difference is the third phase difference. Further, the receiver of the second node may obtain the third phase difference based on the local first sequence and the first delayed sequence.

Step 602e: The second node sends the third phase difference between the local first sequence and the first delayed sequence to the first node. After step 602e, step 603 is performed.

Different from the foregoing process in manner 1, in manner 2, the second node does not shift the local first sequence, and the second node directly sends the third phase difference to the first node. In this way, in step 605, the first node can determine a distance between the first node and the second node based on a second sequence and the third phase difference that are sent by the second node. The second sequence is the local first sequence generated by the second node or a sequence obtained based on the local first sequence. Further, the second node may send the third phase difference between the local first sequence and the first delayed sequence to the first node through the communication interface.

In some embodiments, the first node may send a sequence correspondence to the second node.

The sequence correspondence is used by the second node to determine the second sequence based on the sequence correspondence. It may also be understood that, the second node can convert, based on the sequence correspondence, the local first sequence into a sequence of another sequence structure that has a correspondence with that of the local first sequence. The sequence of the other sequence structure is a sequence that has a same sequence structure as the second sequence. This is equivalent to that the second node can determine, based on the sequence correspondence, a sequence that has the same sequence structure as the second sequence.

For example, by using an example in which the local first sequence is [C1 C2 C3 C4 C5], C1 is a sample point, namely, a sample point C1, C2 is a sample point, namely, a sample point C2, C3 is a sample point, namely, a sample point C3, C4 is a sample point, namely, a sample point C4, and C5 is a sample point, namely, a sample point C5. It is assumed that in the sequence correspondence, the sample point C1 in the local first sequence corresponds to a sample point A, the sample point C2 corresponds to a sample point B, the sample point C3 corresponds to a sample point C, the sample point C4 corresponds to a sample point D, and the sample point C5 corresponds to a sample point E. In this case, the second node may convert the local first sequence [C1 C2 C3 C4 C5] into [A B C D E] based on the sequence correspondence. Similarly, the first node can also convert, based on the sequence correspondence, the sequence generated by the first node.

Step 603: The second node sends a plurality of second sequences to the first node.

When the second node determines the second sequence through the foregoing process in manner 1, the second sequence sent by the second node to the first node is the sequence obtained after the second node shifts the local first sequence based on the first delayed sequence. When the second node determines the second sequence through the foregoing process in manner 2, the second sequence sent by the second node to the first node is the local first sequence generated by the second node or the sequence obtained based on the local first sequence. The plurality of second sequences sent by the second node are used by the first node to determine the distance between the first node and the second node. Further, a transmitter of the second node may send the plurality of second sequences to the first node.

Step 604: The first node receives the plurality of second delayed sequences from the second node.

For details of step 604, refer to description of step 401. Details are not described herein again.

Step 605: The first node determines a first phase difference between the plurality of first sequences and the plurality of second delayed sequences.

For details of step 605, refer to description of step 402. Details are not described herein again.

In some embodiments, the first node has the following two manners of determining the first phase difference.

Manner 3:

Step 605$a$: The first node splices the plurality of first sequences into a first long sequence based on an order of sending the plurality of first sequences, splices the plurality of second delayed sequences into a second long sequence based on an order of receiving the plurality of second delayed sequences, and obtains the first phase difference between the plurality of first sequences and the plurality of second delayed sequences based on the first long sequence and the second long sequence.

For example, it is assumed that the periodicity length of the first sequence is 7, the periodicity quantity is 4, and the first sequence is [C1 C2 C3 C4 C5 C6 C7]. In this case, the first long sequence obtained by splicing the plurality of first sequences by the first node based on the order of sending the plurality of first sequences is [C1 C2 C3 C4 C5 C6 C7 C1 C2 C3 C4 C5 C6 C7 C1 C2 C3 C4 C5 C6 C7 C1 C2 C3 C4 C5 C6 C7]. It is assumed that the second delayed sequence is [C2 C3 C4 C5 C6 C7 C1], the second long sequence obtained by splicing the plurality of second delayed sequences by the first node based on the order of receiving the plurality of second delayed sequences is [C2 C3 C4 C5 C6 C7 C1 C2 C3 C4 C5 C6 C7 C1 C2 C3 C4 C5 C6 C7 C1 C2 C3 C4 C5 C6 C7 C1]. The first node performs a correlation operation on the first long sequence and the second long sequence, and an obtained phase difference is the first phase difference between the plurality of first sequences and the plurality of second delayed sequences. The first phase difference does not exceed one sequence periodicity. The foregoing steps may be performed by a phase capturer of the first node.

Manner 4:

Step 605$b$: The first node obtains the first phase difference between the plurality of first sequences and the plurality of second delayed sequences based on an $N^{th}$ first sequence in the plurality of first sequences sent by the first node and an $N^{th}$ second delayed sequence in the plurality of second delayed sequences received by the first node, where N is an integer greater than or equal to 1, and N is less than or equal to a periodicity quantity of the first sequence.

For example, the sent first sequence should correspond to the received second delayed sequence. The first node performs a correlation operation on the sent $N^{th}$ first sequence and the received $N^{th}$ second delayed sequence. It is assumed that the periodicity length of the first sequence is 7, the periodicity quantity is 8, the first sequence is [C1 C2 C3 C4 C5 C6 C7], and the second delayed sequence is [C2 C3 C4 C5 C6 C7 C1]. In this case, the first node performs a correlation operation based on a fourth first sequence [C1 C2 C3 C4 C5 C6 C7] in the plurality of first sequences sent by the first node and a fourth second delayed sequence [C2 C3 C4 C5 C6 C7 C1] in the plurality of second delayed sequences received by the first node, and an obtained phase difference is the first phase difference between the plurality of first sequences and the plurality of second delayed sequences. The first phase difference does not exceed one sequence periodicity. The foregoing steps may be performed by a phase capturer of the first node.

In some embodiments, the first node converts, based on a sequence correspondence, the plurality of first sequences into a plurality of first converted sequences that have a same sequence structure as the second sequence, and the first node obtains the first phase difference based on the plurality of first converted sequences and the plurality of second delayed sequences.

For example, if the second sequence sent by the second node to the first node is a second sequence obtained after conversion based on the sequence correspondence, the first node may convert, based on a same sequence correspondence, the plurality of first sequences sent by the first node into the plurality of first converted sequences that have the same structure as the second sequence sent by the second node. In this way, the first node can obtain a first phase difference based on the plurality of first converted sequences and the plurality of second delayed sequences, where the first phase difference is the phase difference between the plurality of first sequences and the plurality of second delayed sequences. The foregoing actions may be performed by the phase capturer of the first node.

Step 606: The first node determines the distance between the first node and the second node based on the first phase difference.

For details of step 604, refer to description of step 403. When the second node performs sequence alignment on the generated local first sequence and the received first delayed sequence based on manner 1 and the local first sequence is completely aligned with the first delayed sequence (in other words, there is no residual phase difference, and the obtained second sequence is the same as the first delayed sequence), the first phase difference determined by the first node is a phase difference used to determine a round-trip distance between the first node and the second node. Therefore, the first node can determine the distance between the first node and the second node based on only the first phase difference.

In some embodiments, step 606 may be replaced with step 606$a$: The first node determines the distance between the first node and the second node based on the first phase difference and the residual phase difference.

When the second node performs sequence alignment on the generated local first sequence and the received first delayed sequence based on manner 1 but the local first sequence is not completely aligned with the first delayed sequence and there is a residual phase difference, the first phase difference determined by the first node is a partial phase difference used to determine the round-trip distance between the first node and the second node. The first node receives the residual phase difference sent by the second node, where a sum of the first phase difference and the residual phase difference is the phase difference used to determine the round-trip distance between the first node and the second node. Therefore, the first node may determine the distance between the first node and the second node based on the first phase difference and the residual phase difference. Further, a delay calculator of the first node may determine the distance between the first node and the second node based on the first phase difference and the residual phase difference.

In some embodiments, step 606 may be replaced with step 606*b*: The first node determines the distance between the first node and the second node based on the first phase difference and the third phase difference.

When the second node does not shift the local first node based on manner 2, the first phase difference determined by the first node is a phase difference used to determine a one-way distance between the second node and the first node. The first node receives the third phase difference sent by the second node, where a sum of the first phase difference and the third phase difference is the phase difference used to determine a round-trip distance between the first node and the second node. Therefore, the first node may determine the distance between the first node and the second node based on the first phase difference and the third phase difference. Further, a delay calculator of the first node may determine the distance between the first node and the second node based on the first phase difference and the third phase difference.

In some embodiments, before step 601, the first node may send a first message to the second node, where the first message is for agreeing to reserve time for ranging. If the time for ranging overlaps time for inter-node communication, the ranging and the communication are mutually affected. Therefore, the first node and the second node may agree to reserve a period of time for ranging in advance, to improve ranging accuracy. The foregoing actions may be performed by the first node or the second node through the communication interface.

In some embodiments, the sequence involved in step 601 to step 606 may be a broadband sequence, namely, a broadband sequence whose bandwidth frequency is greater than or equal to 12 MHz. Because the bandwidth frequency is large, an obtained ranging error is small. Therefore, ranging precision is high, so that ranging accuracy can be improved.

Figure 9A:
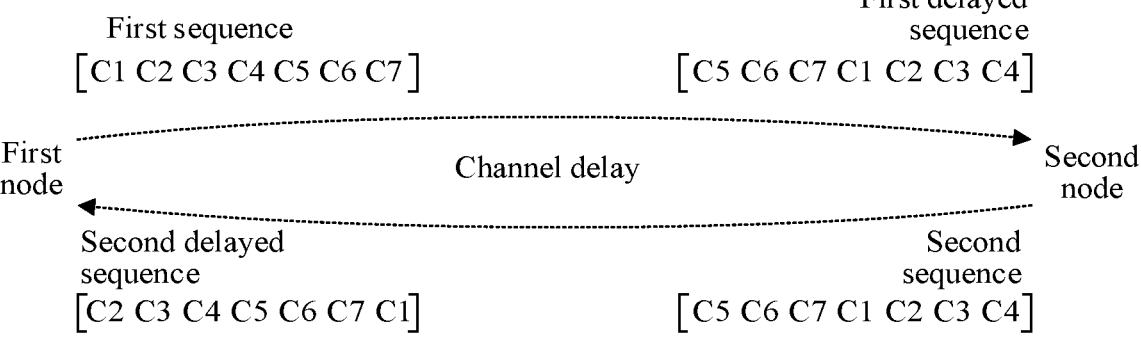
FIG. 9A is a schematic flowchart of sequence transmis-sion according to an embodiment of this disclosure.

Based on the foregoing steps, FIG. 9A is a schematic diagram of sequences sent by a first node and a second node according to an embodiment of this disclosure. An example in which the second node uses the processing manner in manner 1 is used. A first sequence sent by the first node to the second node is [C1 C2 C3 C4 C5 C6 C7]. After the first sequence undergoes a channel delay, the second node receives a first delayed sequence [C5 C6 C7 C1 C2 C3 C4]. The second node determines that a phase difference between a local first sequence and the first delayed sequence is 3.

When the second node performs sequence alignment on the local first sequence and the first delayed sequence and the local first sequence is completely aligned with the first delayed sequence, an obtained second sequence is [C5 C6 C7 C1 C2 C3 C4]. The second node sends the second sequence to the first node, the first node receives a second delayed sequence [C2 C3 C4 C5 C6 C7 C1], and the first node determines that a first phase difference between the first sequence and the second delayed sequence is 6. Therefore, the first node determines a distance between the first node and the second node based on the first phase difference 6.

Figure 9B:
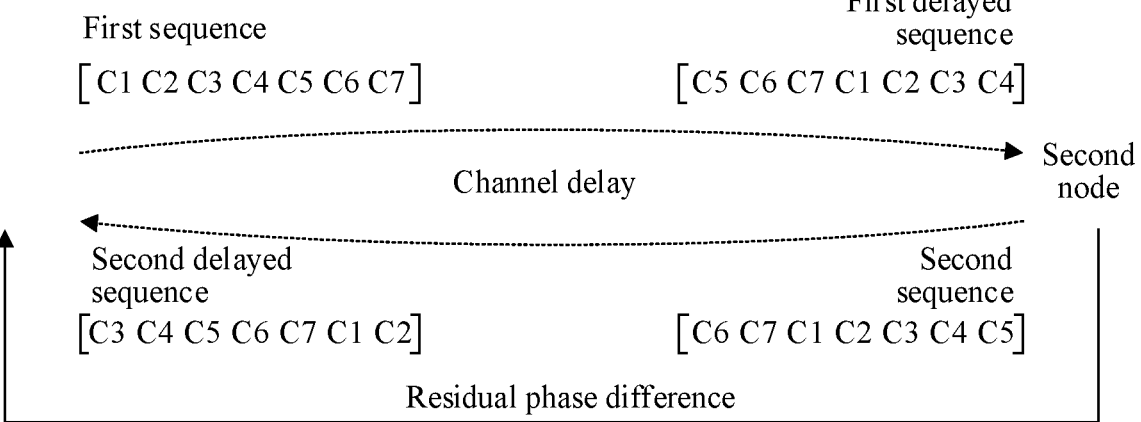
FIG. 9B is a schematic flowchart of sequence transmis-sion according to an embodiment of this disclosure.

FIG. 9B is a schematic diagram of sequences sent by a first node and a second node according to an embodiment of this disclosure. An example in which the second node uses the processing manner in manner 1 is used. A first sequence sent by the first node to the second node is [C1 C2 C3 C4 C5 C6 C7]. After the first sequence undergoes a channel delay, the second node receives a first delayed sequence [C5 C6 C7 C1 C2 C3 C4]. The second node determines that a phase difference between a local first sequence and the first delayed sequence is 3. When the second node performs sequence alignment on the local first sequence and the first delayed sequence but the local first sequence is not completely aligned with the first delayed sequence and there is a residual phase difference, an obtained second sequence is [C6 C7 C1 C2 C3 C4 C5]. There is still a residual phase difference 1 between the second sequence and the first delayed sequence. The second node sends the second sequence and the residual phase difference to the first node, the first node receives a second delayed sequence [C3 C4 C5 C6 C7 C1 C2], and the first node determines that a first phase difference between the first sequence and the second delayed sequence is 5. Therefore, the first node determines a distance between the first node and the second node based on the first phase difference 5 and the residual phase difference 1.

Figure 9C:
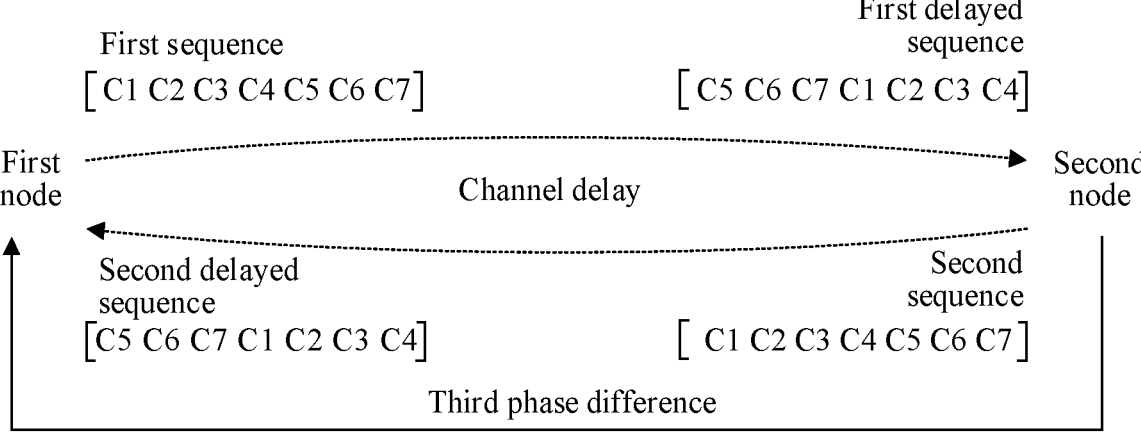
FIG. 9C is a schematic flowchart of sequence transmis-sion according to an embodiment of this disclosure.

FIG. 9C is a schematic diagram of sequences sent by a first node and a second node according to an embodiment of this disclosure. An example in which the second node uses the processing manner in manner 2 is used. A first sequence sent by the first node to the second node is [C1 C2 C3 C4 C5 C6 C7]. After the first sequence undergoes a channel delay, the second node receives a first delayed sequence [C5 C6 C7 C1 C2 C3 C4]. The second node determines that a third phase difference between a local first sequence and the first delayed sequence is 3. The second node does not perform sequence alignment on the local first sequence, and directly sends a local first sequence [C1 C2 C3 C4 C5 C6 C7] (equivalent to a second sequence) and the third phase difference to the first node. The first node receives a second delayed sequence [C5 C6 C7 C1 C2 C3 C4], and the first node determines that a first phase difference between the first sequence and the second delayed sequence is 3. Therefore, the first node determines a distance between the first node and the second node based on the first phase difference 3 and the third phase difference 3.

In this way, the inter-node ranging method provided in this embodiment of this disclosure may be applied to the electronic device, for example, a chip. During inter-node ranging, sequences are transmitted to determine a phase difference between sequences sent by a node and sequences received by the node, to determine a distance between nodes. Because the sequence has a small PAR, and has high transmit power within a linear range of a power amplifier, communication efficiency can be improved, so that ranging precision is higher, a ranging error is smaller, and a structure of a ranging device is simplified. In addition, the sequence uses a broadband sequence, so that ranging precision can be further improved, and a ranging error can be effectively reduced.

Figure 10:
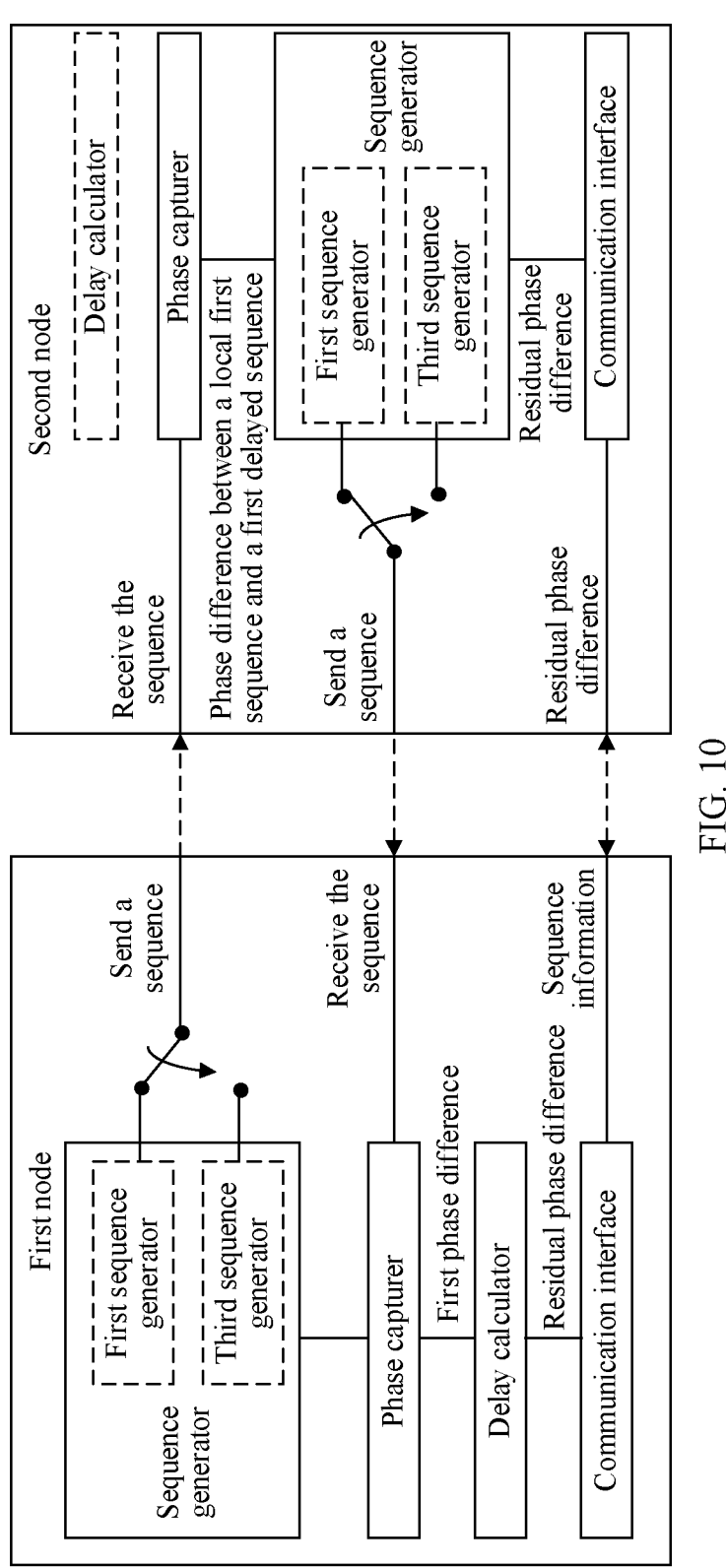
FIG. 10 is a schematic flowchart of an inter-node ranging method according to an embodiment of this disclosure.

Corresponding to the inter-node ranging method provided in FIG. 6, based on the structure of the electronic device shown in FIG. 3, FIG. 10 is a schematic flowchart of inter-node ranging according to an embodiment of this disclosure. An example in which the electronic device includes a first node and a second node, and the first node and the second node include a structure of the chip 300 shown in FIG. 3 is used. Each of the first node and the second node shown in FIG. 10 includes a transmitter, a receiver, a processor, and a communication interface. An example in which a sequence generator is a transmitter, a phase capturer is a receiver, and a delay calculator processor is a processor is used (in an inter-node ranging process shown in FIG. 10, the second node does not use a delay calculator, and in some cases, the second node may also use the delay calculator to determine an inter-node distance).

The transmitter (sequence generator) may be configured to support the chip 300 in performing step 400, step 601, step 601a, step 602b, step 603, and the like, and/or other processes of the technology described in this specification.

The receiver (phase capturer) may be configured to support the chip 300 in performing step 401, step 402, step 602, step 602a, step 602b, step 602d, step 604, step 605, step 605a, step 605b, and the like, and/or other processes of the technology described in this specification.

The processor (delay calculator) may be configured to support the chip 300 in performing step 403, step 606, step 606a, step 606b, and the like, and/or other processes of the technology described in this specification.

The communication interface may be configured to support the chip 300 in performing step 600, step 602c, step 602e, and the like, and/or other processes of the technology described in this specification.

Based on this, an example in which the second node uses the processing manner in manner 1 and a residual phase difference is not 0 is used in a working procedure shown in FIG. 10. The working procedure may include that the first node sends sequence information to the second node through the communication interface, and the second node receives the sequence information sent by the first node through the communication interface, so the first node and the second node can generate a same sequence. The sequence information may be sequence information of a first sequence and sequence information of a third sequence. The sequence generator of the first node generates the first sequence based on the sequence information of the first sequence, and sends the first sequence to the second node. The sequence generator of the first node may also generate the third sequence based on the sequence information of the third sequence, and send the third sequence to the second node. By using an example in which the first node sends the first sequence, the phase capturer of the second node receives a first delayed sequence from the first node, and performs a correlation operation on a local first sequence generated by the second node and the first delayed sequence received by the second node, to obtain a phase difference between the local first sequence and the first delayed sequence. The phase capturer of the second node sends the obtained phase difference to the sequence generator of the second node, and the sequence generator of the second node shifts the local first sequence generated by the second node based on the first delayed sequence. This is equivalent to that the sequence generator of the second node performs alignment on the first delayed sequence as much as possible based on the local first sequence, eliminates the phase difference between the local first sequence and the first delayed sequence as much as possible by shifting the local first sequence, and sends a second sequence obtained after the shift to the first node. In addition, if the second sequence is not completely aligned with the first delayed sequence, the sequence generator of the second node further sends a residual phase difference between the second sequence and the first delayed sequence to the first node through the communication interface of the second node. The phase capturer of the first node receives a second delayed sequence from the second node, and performs a correlation operation on the first sequence sent by the first node on the second delayed sequence received by the first node, to obtain a first phase difference. The delay calculator of the first node receives the first phase difference sent by the phase capturer of the first node and a residual phase difference sent by the communication interface of the first node, and can calculate a distance between the first node and the second node based on the first phase difference and the residual phase difference.

In this way, an inter-node ranging method provided in this embodiment of this disclosure may be applied to an electronic device, for example, a chip. The electronic device includes a transmitter (sequence generator), a receiver (phase capturer), a processor (delay calculator), and a communication interface. Compared with other technologies, a ranging device in the other technologies includes a time stamp generator, and network clock synchronization is performed during ranging to improve ranging accuracy. As a result, the ranging device and a ranging solution in the other technologies are complex. However, the electronic device in this disclosure sends sequence information through the communication interface to synchronize generated sequences. Therefore, a structure of the electronic device in this disclosure is simpler, a ranging solution is simpler, ranging precision is higher, and a ranging error is smaller.

It may be understood that, to implement the foregoing functions, the electronic device includes a corresponding hardware structure and/or software module for performing each of the functions. A person skilled in the art should be easily aware that, in combination with the examples described in embodiments disclosed in this specification, units, algorithms, and steps may be implemented by hardware or a combination of hardware and computer software in embodiments of this disclosure. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of embodiments of this disclosure.

In embodiments of this disclosure, the electronic device may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in embodiments of this disclosure, module division is an example, and is merely a logical function division. In actual implementation, another division manner may be used.

Figure 11:
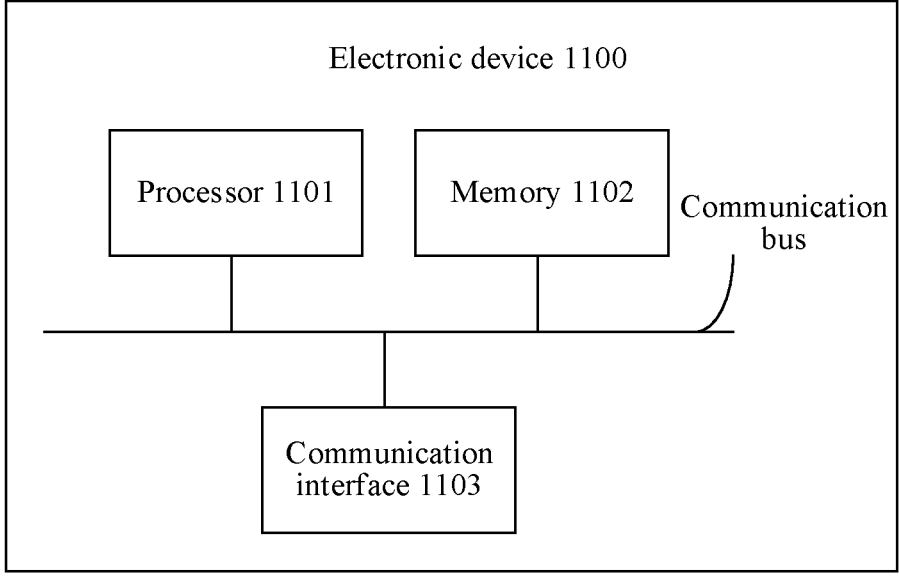
FIG. 11 is a schematic composition diagram of a structure of an electronic device according to an embodiment of this disclosure.

When an integrated unit is used, as shown in FIG. 11, an embodiment of this disclosure discloses an electronic device 1100. The electronic device 1100 may be the chip 300 in the foregoing embodiment. The electronic device 1100 may include a processing module, a storage module, and a communication module. The processing module may be configured to control and manage actions of the electronic device 1100, for example, may be configured to support the electronic device 1100 in performing the steps performed by the transmitter (sequence generator), the receiver (phase capturer), and the processor (delay calculator). The storage module may be configured to support the electronic device 1100 in storing program code, data, and the like. The communication module may be configured to support the electronic device 1100 in communicating with another device, for example, may be configured to support the electronic device 1100 in performing the steps performed by the communication interface.

Certainly, the unit modules in the electronic device 1100 include but are not limited to the processing module, the storage module, and the communication module.

The processing module may be a processor or a controller, the processor may implement or execute various example logical blocks, modules, and circuits described with reference to content disclosed in this disclosure. The processor may alternatively be a combination for implementing a computing function, for example, a combination including one or more microprocessors or a combination of a digital signal processor (DSP) and a microprocessor. The storage module may be a memory. Further, the communication module may be a device that exchanges with another external device.

For example, the processing module is a processor 1101 (for example, the processor 301 shown in FIG. 3), the storage module may be a memory 1102 (for example, the memory 302 shown in FIG. 3), and the communication module may be referred to as a communication interface 1103 (for example, the communication interface 303 shown in FIG. 3). The electronic device 1100 provided in this embodiment of this disclosure may be the chip 300 shown in FIG. 3. The processor 1101, the memory 1102, the communication interface 1103, and the like may be connected together, for example, connected through a bus.

An embodiment of this disclosure further provides an electronic device, including one or more processors and one or more memories. The one or more memories are coupled to the one or more processors. The one or more memories are configured to store computer program code. The computer program code includes computer instructions. When the one or more processors execute the computer instructions, the electronic device is enabled to perform the foregoing related method steps to implement the inter-node ranging method in the foregoing embodiments.

An embodiment of this disclosure further provides an electronic device. The electronic device includes one or more communication interfaces and one or more processors. The communication interface and the processor are interconnected by using a line. The processor receives and executes computer instructions from a memory of the electronic device through the communication interface, so that the electronic device performs the foregoing related method steps to implement the inter-node ranging method in the foregoing embodiments.

An embodiment of this disclosure further provides a computer-readable storage medium. The computer-readable storage medium stores computer program code. When computer instructions are run on a computer or a processor, the computer or the processor is enabled to perform the inter-node ranging method in the foregoing embodiments.

An embodiment of this disclosure further provides a computer program product. The computer program product includes computer instructions. When the computer instructions are run on a computer or a processor, the computer or the processor is enabled to perform the foregoing related steps to implement the inter-node ranging method performed by the electronic device in the foregoing embodiments.

The electronic device, the electronic device, the computer storage medium, the computer program product, or the chip provided in embodiments may be configured to perform the corresponding method provided above. Therefore, for beneficial effects that can be achieved, refer to the beneficial effects of the corresponding method provided above. Details are not described herein again.

Based on descriptions about the foregoing implementations, a person skilled in the art may understand that, for a purpose of convenient and brief description, division into the foregoing functional modules is used as an example for illustration. In actual application, the foregoing functions may be allocated to different functional modules and implemented according to a requirement. In other words, an inner structure of an apparatus is divided into different functional modules to implement all or some of the functions described above.

In the several embodiments provided in this disclosure, it should be understood that the disclosed apparatus and method may be implemented in other manners. For example, the described apparatus embodiment is merely an example. For example, the module or division into the units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this disclosure may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of embodiments of this disclosure essentially, or the part contributing to the other technologies, or all or some of the technical solutions may be implemented in the form of a software product. The software product is stored in a storage medium and includes several instructions for instructing a device (which may be a single-chip microcomputer, a chip or the like) or a processor to perform all or some of the steps of the methods described in embodiments of this disclosure. The foregoing storage medium includes any medium that can store program code, for example, a Universal Serial Bus (USB) flash drive, a removable hard disk drive, a read-only memory (ROM), a RAM, a magnetic disk, or an optical disc.

The foregoing descriptions are merely specific implementations of this disclosure, but are not intended to limit the protection scope of this disclosure. Any variation or replacement readily figured out by a person skilled in the art in the technical scope disclosed in this disclosure shall fall within the protection scope of this disclosure. Therefore, the protection scope of this disclosure shall be subject to the protection scope of the claims.

What is claimed is:

1. A method implemented by a first node, wherein the method comprising:
sending, to a second node, first sequences;
receiving, from the second node in response to the first sequences, second delayed sequences;
splicing, based on a first order of sending the first sequences, the first sequences into a first long sequence;
splicing, based on a second order of receiving the second delayed sequences, the second delayed sequences into a second long sequence;
obtaining, based on the first long sequence and the second long sequence, a first phase difference between the first sequences and the second delayed sequences; and
obtaining, based on the first phase difference, a distance between the first node and the second node.

2. The method of claim 1, wherein the second delayed sequences are based on a channel delay on second sequences.

3. The method of claim 2, wherein each of the second sequences is based on a corresponding local first sequence from the second node and a first delayed sequence, and wherein the corresponding local first sequence is one of the first sequences.

4. The method of claim 3, further comprising:
receiving, from the second node, a residual phase difference that is between each of the second sequences and the first delayed sequence; and
further obtaining, based on the residual phase difference, the distance.

5. The method of claim 2, wherein each of the second sequences is a local first sequence from the second node or a third sequence that is based on the local first sequence, and wherein the local first sequence is one of the first sequences.

6. The method of claim 5, further comprising:
receiving, from the second node, a second phase difference between the local first sequence and a first delayed sequence; and
further obtaining, based on the second phase difference, the distance.

7. The method of claim 2, wherein before receiving the second delayed sequences, the method further comprises sending, to the second node, a sequence correspondence to instruct the second node to obtain, based on the sequence correspondence, third sequences having same sequence structures as the second sequences.

8. The method of claim 7, further comprising:
converting, based on the sequence correspondence, the first sequences into first converted sequences that have same sequence structures as the second sequences; and
obtaining, based on the first converted sequences and the second delayed sequences, the first phase difference.

9. The method of claim 1, further comprising obtaining, based on an $N^{th}$ first sequence in the first sequences and an $N^{th}$ second delayed sequence in the second delayed sequences, the first phase difference, wherein N is an integer greater than or equal to 1.

10. The method of claim 1, wherein after sending the first sequences, the method further comprises sending, to the second node, third sequences instructing the second node to send fourth sequences to the first node after receiving third delayed sequences, and wherein the third delayed sequences are based on a channel delay on the third sequences.

11. The method of claim 10, wherein before sending the first sequences, the method further comprises sending, to the second node, sequence information of the first sequences to instruct the second node to generate the first sequences.

12. The method of claim 1, wherein each of the first sequences and the second delayed sequences is one of a binary pseudo-random noise sequence, a multi-phase pseudo-random noise sequence, a Frank sequence, or a Zadoff-Chu sequence.

13. A method implemented by a second node, the method comprising:
receiving, from a first node, first delayed sequences, wherein the first delayed sequences are based on a channel delay on first sequences;
receiving, after receiving the first delayed sequences, second delayed sequences instructing to send third sequences to the first node, wherein the second delayed sequences are based on the channel delay on fourth sequences from the first node; and
sending, to the first node in response to the first delayed sequences, second sequences to enable the first node to obtain a distance between the first node and the second node.

14. The method of claim 13, wherein after receiving the first delayed sequences, the method further comprises:
generating local first sequences that are the same as the first sequences; and
shifting, based on the first delayed sequences, the local first sequences to obtain the second sequences.

15. The method of claim 14, further comprising:
obtaining residual phase differences between the second sequences and the first delayed sequences; and
sending, to the first node, the residual phase differences to enable the first node to obtain the distance.

16. The method of claim 13, wherein the second sequences are local first sequences from the second node or fifth sequences that are based on the local first sequences, wherein the local first sequences are the same as the first sequences, and wherein the method further comprises sending, to the first node, phase differences between the local first sequences and the first delayed sequences to enable the first node to obtain the distance.

17. The method of claim 13, wherein before receiving the first delayed sequences, the method further comprises receiving, from the first node, sequence information of the first sequences, and wherein the sequence information enables the first node or the second node to generate the first sequences.

18. A first node comprising:
a transmitter configured to send first sequences to a second node;
a receiver configured to receive second delayed sequences from the second node in response to the first sequences;
one or more processors coupled to the transmitter and the receiver and configured to:
splice, based on a first order of sending the first sequences, the first sequences into a first long sequence;

splice, based on a second order of receiving the second delayed sequences, the second delayed sequences into a second long sequence;

obtain, based on the first long sequence and the second long sequence, a phase difference between the first sequences and the second delayed sequences; and obtain, based on the phase difference, a distance between the first node and the second node.

19. The first node of claim 18, further comprising sending, to the second node before receiving the second delayed sequences, a sequence correspondence to instruct the second node to obtain, based on the sequence correspondence, third sequences having same sequence structures as second sequences, wherein the second delayed sequences are based on a channel delay on the second sequences.

20. The first node of claim 18, further comprising:

receiving, from the second node, a residual phase difference that is between each of second sequences and a first delayed sequence; and further obtaining, based on the residual phase difference, the distance.

\* \* \* \* \*